(12) United States Patent
Nam et al.

(10) Patent No.: US 12,114,273 B2
(45) Date of Patent: *Oct. 8, 2024

(54) DYNAMIC TIMING ADJUSTMENT FOR NEW RADIO INTEGRATED ACCESS AND BACKHAUL NODE

(71) Applicant: QUALCOMM Incorporated, San Diego, CA (US)

(72) Inventors: Wooseok Nam, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,376

(22) Filed: Nov. 14, 2022

(65) Prior Publication Data
US 2023/0156635 A1 May 18, 2023

Related U.S. Application Data

(63) Continuation of application No. 16/538,403, filed on Aug. 12, 2019, now Pat. No. 11,503,555.
(Continued)

(51) Int. Cl.
*H04W 56/00* (2009.01)
*H04L 27/26* (2006.01)
(Continued)

(52) U.S. Cl.
CPC ..... *H04W 56/0005* (2013.01); *H04L 27/2666* (2013.01); *H04W 56/001* (2013.01); *H04W 74/04* (2013.01); *H04W 76/27* (2018.02)

(58) Field of Classification Search
CPC ........... H04W 56/0005; H04W 56/001; H04W 74/04; H04W 76/27; H04W 16/26; H04L 27/2666; H04B 7/15507; H04J 3/0602
See application file for complete search history.

(56) References Cited

U.S. PATENT DOCUMENTS

| 11,503,555 B2 | 11/2022 | Nam et al. |
| 2013/0070726 A1 | 3/2013 | Zhang et al. |

(Continued)

FOREIGN PATENT DOCUMENTS

| CN | 110113122 A | * 8/2019 | ............ H04J 3/0673 |
| CN | 110475336 A | * 11/2019 | ............ H04J 3/0602 |

(Continued)

OTHER PUBLICATIONS

AT & T: "Summary of 7.7.1 Enhancements to Support NR Backhaul Links", 3GPP Draft, R1-1805673, 3GPP TSG RAN WG1 Meeting #92bis, Summary of 7_7_1—IAB-PHY VE00, 3rd Generation Partnership Project (3GPP), Mobile Competence Centre, 650, Route Des Lucioles, F-06921 Sophia-Antipolis Cedex, France, vol. RAN WG1, no. Sanya, China, Apr. 16, 2018-Apr. 20, 2018, Apr. 19, 2018, XP051427800, 13 Pages.

(Continued)

*Primary Examiner* — Ayaz R Sheikh
*Assistant Examiner* — Louis Samara
(74) *Attorney, Agent, or Firm* — Paul M. McAdams; Shumaker & Sieffert, PA

(57) ABSTRACT

Aspects of the present disclosure provide techniques for dynamically adjusting the access link timing alignment at the integrated access and backhaul (IAB) node. Specifically, features of the present disclosure provide techniques for signaling to one or more child nodes the timing advance and timing offset values associated with each operational mode of the IAB node that may impact the access link timing for the child node (for uplink and/or downlink transmissions). Additionally or alternatively, aspects of the present disclosure identify whether a gap period may be included in order to ensure that the child node has sufficient time to transition between states during the transition period (e.g., from down- (Continued)

link to uplink) when the IAB node dynamically adjusts the access link timing.

21 Claims, 12 Drawing Sheets

Related U.S. Application Data

(60) Provisional application No. 62/719,385, filed on Aug. 17, 2018.

(51) Int. Cl.
*H04W 74/04* (2009.01)
*H04W 76/27* (2018.01)

(56) References Cited

U.S. PATENT DOCUMENTS

| | | |
|---|---|---|
| 2014/0029508 A1 | 1/2014 | Kim et al. |
| 2015/0063213 A1 | 3/2015 | Laroia et al. |
| 2015/0271723 A1 | 9/2015 | Yang et al. |
| 2018/0092139 A1 | 3/2018 | Novlan et al. |
| 2018/0102807 A1* | 4/2018 | Chen ............... H04L 27/2657 |
| 2018/0302196 A1 | 10/2018 | Sadeghi et al. |
| 2019/0141762 A1* | 5/2019 | Novlan ............ H04B 7/15507 |
| 2019/0150141 A1* | 5/2019 | Irukulapati ............ H04L 5/14 370/280 |
| 2019/0159149 A1* | 5/2019 | Ryu ............... H04W 56/0045 |
| 2019/0349036 A1 | 11/2019 | Wang et al. |
| 2019/0349871 A1 | 11/2019 | Ghosh et al. |
| 2020/0007223 A1* | 1/2020 | Zhu ..................... H04W 16/26 |
| 2020/0008218 A1 | 1/2020 | Shih et al. |
| 2020/0245317 A1* | 7/2020 | Hwang ................ H04W 68/02 |
| 2020/0383073 A1* | 12/2020 | Liu ....................... H04J 3/0673 |
| 2021/0058882 A1* | 2/2021 | Abedini ............... H04W 72/56 |
| 2021/0058884 A1 | 2/2021 | Liu et al. |
| 2021/0160861 A1* | 5/2021 | You ................... H04W 56/0005 |
| 2021/0250884 A1 | 8/2021 | Iyer et al. |

FOREIGN PATENT DOCUMENTS

| | | |
|---|---|---|
| WO | 2010095883 A2 | 8/2010 |
| WO | 2019074982 A1 | 4/2019 |
| WO | WO-2020076011 A1 * | 4/2020 ........... H04L 5/0048 |

OTHER PUBLICATIONS

Intel Corporation: "Overview on RAN1 Related Issues in IAB", 3GPP TSG RAN WG1 #92bis, R1-1804755, Apr. 16-Apr. 20, 2018, Sanya, China, pp. 1-15.
International Search Report and Written Opinion—PCT/US2019/046355—ISA/EPO—Nov. 4, 2019, 20 Pages.
"Joint Uplink/Downlink Optimization for Backhaul-Limited Mobile Cloud Computing with User Scheduling", Ali Al-Shuwaili, Osvaldo Simeone, Alireza Bagheri, and Gesualdo Scutari, Feb. 3, 2017, 15 Pages.
LG Electronics: "Discussions on NR IAB Support", 3GPP Draft; R1-1806649 Discussions on IAB Support V4, 3rd Generation Partnership Project (3GPP), Mobile Competence Centre; 650, Route Des Lucioles ; F-06921 Sophia-Antipolis Cedex ; France, vol. RAN WG1, No. Busan, Korea; May 21, 2018-May 25, 2018, May 12, 2018 (May 12, 2018), XP051462689, 12 Pages.

* cited by examiner

DYNAMIC TIMING ADJUSTMENT FOR NEW RADIO INTEGRATED ACCESS AND BACKHAUL NODE

CROSS REFERENCE TO RELATED APPLICATIONS

The present application is a Continuation of U.S. Non-Provisional application Ser. No. 16/538,403, filed on Aug. 12, 2019, entitled "Dynamic Timing Adjustment For New Radio Integrated Access And Backhaul Node" which claims priority to U.S. Provisional Application No. 62/719,385, filed on Aug. 17, 2018, entitled "Dynamic Timing Adjustment For New Radio Integrated Access And Backhaul Node," the contents of both of which are incorporated by reference in their entireties.

BACKGROUND

The present disclosure relates to wireless communication systems, and more particularly, dynamically adjusting timing for new radio integrated access and backhaul (IAB) node in wireless communication systems.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

However, mobile networks are facing soaring demands for mobile data as consumers increasingly utilize mobile devices to share and consume high-definition multi-media. In addition, as the capabilities of mobile devices continue to grow with advancements such as higher-resolution cameras, 4K video, always-connected cloud computing, and virtual/augmented reality, so does the ever-increasing demand for faster and improved connectivity. Enhancing mobile broadband services is one of the driving forces behind a fifth generation (5G) wireless communications technology (which may be referred to as new radio (NR)) that is envisaged to expand and support diverse usage scenarios and applications with respect to current mobile network generations.

One aspect of the 5G NR communications technology includes the use of high-frequency spectrum bands above 24 GHz, which may be referred to as millimeter wave (mmW), that is emerging as a 5G technology. The use of these bands is compelling as the large bandwidths available at these high frequencies enable extremely high data rates and significant increases in capacity. There may be some limitations in the usage of mmW bands, such as lack of robustness for mobile broadband applications due to increased propagation loss and susceptibility to blockage (e.g., hand, head, body, foliage, buildings or other structures). As such, compared to lower frequency communication systems, distance between base stations in a mmW communication system may be very short (e.g., 150-200 meters), which may require deployment of a large number of base stations in close proximity. Such base stations having relatively smaller coverage areas, as compared to the coverage area of typical cellular base stations (e.g., having higher transmit power and/or utilizing lower frequency transmissions), may be referred to as small cell base stations or small cells.

Due to the high density deployment of small cells needed to support 5G technology, equipping each such mmW small cell with a wireline backhaul link may not be practical. As such, network operators have considered using wireless backhaul as a more cost-effective alternative solution for high-density deployment scenarios. However, utilization of wireless backhaul communication introduces additional implementation challenges.

Thus, as the demand for mobile broadband access continues to increase, further improvements in NR communications technology and beyond may be desired.

SUMMARY

Aspects of the present disclosure provide techniques for dynamically adjusting the access link timing alignment at the IAB node. Specifically, features of the present disclosure provide techniques for signaling to one or more child nodes the timing advance and timing offset values associated with each operational mode of the IAB node that may impact the access link timing for the child node (for uplink and/or downlink transmissions). Additionally or alternatively, aspects of the present disclosure identify whether a gap period may be included in order to ensure that the child node has sufficient time to transition between states during the transition period (e.g., from downlink to uplink) when the IAB node dynamically adjusts the access link timing.

In one example, a method for wireless communication includes determining, at an integrated access and backhaul node, to transition from a first operational mode to a second operational mode, wherein the first operational mode is associated with a first access link timing and the second operational mode is associated with a second access link timing. The method may further include identifying a timing offset value from a base reference time that is associated with the second operational mode. The method may further include transmitting a dynamic timing indication to a child node that identifies the timing offset value.

In another example, an apparatus may include a memory having instructions and a processor configured to execute the instructions to perform the steps of determining, at an integrated access and backhaul node, to transition from a first operational mode to a second operational mode, wherein the first operational mode is associated with a first access link timing and the second operational mode is associated with a second access link timing, identifying a timing offset value from a base reference time that is associated with the second operational mode, and transmitting a dynamic timing indication to a child node that identifies the timing offset value.

In some aspects, a non-transitory computer readable medium includes instructions stored therein that, when executed by a processor, cause the processor to perform the steps of determining, at an integrated access and backhaul node, to transition from a first operational mode to a second operational mode, wherein the first operational mode is associated with a first access link timing and the second operational mode is associated with a second access link timing, identifying a timing offset value from a base reference time that is associated with the second operational mode, and transmitting a dynamic timing indication to a child node that identifies the timing offset value.

In certain aspects, an apparatus includes means for determining, at an integrated access and backhaul node, to transition from a first operational mode to a second operational mode, wherein the first operational mode is associated with a first access link timing and the second operational mode is associated with a second access link timing, means for identifying a timing offset value from a base reference time that is associated with the second operational mode, and means for transmitting a dynamic timing indication to a child node that identifies the timing offset value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
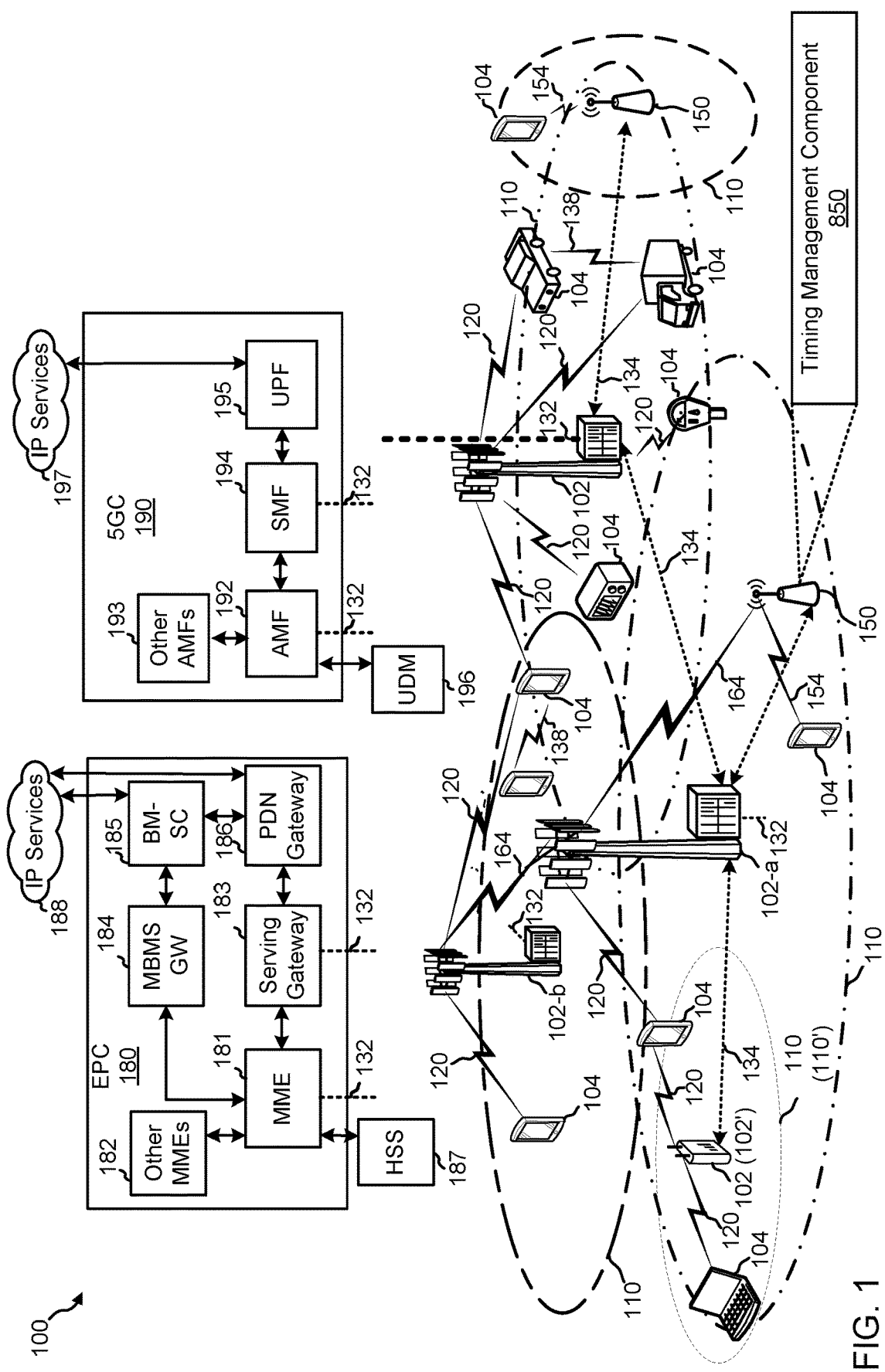
FIG. 1 is a schematic diagram of an example of a wireless communications system in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout the disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium, such as a computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV- DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

As discussed above, one aspect of the 5G NR communications technology includes the use of high-frequency spectrum bands above 24 GHz, which may be referred to as mmW. The use of these bands enable extremely high data rates and significant increases in data processing capacity. However, compared to LTE, mmW bands are susceptible to rapid channel variations and suffer from severe free-space path loss and atmospheric absorption. In addition, mmW bands are highly vulnerable to blockage (e.g. hand, head, body, foliage, building penetration). Particularly, at mmW frequencies, even small variations in the environment, such as the turn of the head, movement of the hand, or a passing car, may change the channel conditions between the base station (BS) and the user equipment (UE), and thus impact communication performance.

Current mmW 5G NR systems leverage the small wavelengths of mmW at the higher frequencies to make use of multiple input multiple output (MIMO) antenna arrays to create highly directional beams that focus transmitted radio frequency (RF) energy in order to attempt to overcome the propagation and path loss challenges in both the uplink and downlink links. The isotropic path loss and the propagation characteristics of the mmWave environment, however, demands a dense next generation node base station (gNBs) (i.e., base stations in NR technology) deployment to guarantee line-of-sight links at any given time and to decrease the outage probability. In such deployments, equipping each such gNBs with a wired backhaul link (e.g., fiber) may not be feasible due to the high expense involved. As such, network operators have considered using wireless backhaul as a more cost-effective alternative solution for high-density deployment scenarios. However, utilization of wireless backhaul communication introduces additional implementation challenges, including interference management.

Facilitating wireless backhaul communication may include utilizing IAB nodes (which may include "relay nodes") that may have both a base station (gNB)-type and user equipment (UE)-type functionalities. The IAB nodes provide the wireless communications system flexibility such that only a fraction of gNBs may be equipped with a traditional wired backhaul capabilities (e.g., using cable or optical fiber), while the rest of the gNBs (or IAB nodes) may have direct or indirect (e.g., via relay nodes) wireless connections to the wired backhaul, e.g., possibly through multiple hops via one or more relay nodes. According to the 3GPP agreements, NR cellular networks with IAB functionalities may be characterized by (i) the possibility of using the mmWave spectrum; (ii) the integration of the access and backhaul technologies (i.e., using the same spectral resources and infrastructures to serve both mobile terminals in access as well as the NR gNBs in backhaul); and, (iii) the possibility of deploying plug-and-play IAB nodes capable of self-configuring and self-optimizing themselves.

To this end, the IAB nodes may include the gNB-type functionality that allows for transmission and reception of signals to and from child nodes (e.g., UE or another IAB node) through an access link. Additionally, the IAB nodes may also include the UE-type functionality that allows for transmission and reception of signals to and from parent node (e.g., gNB or another IAB node) through backhaul links. By utilizing an IAB nodes, a common architecture, waveforms, and procedures may be shared for access links and backhaul links, thereby reducing the system complexity. For example, the IAB nodes may share the same wireless resources (e.g., via TDM or FDM) between the access links and backhaul links.

In some examples, IAB nodes may allow concurrent transmission or reception for higher resource efficiency. Concurrent transmission or reception may refer to transmission and/or reception that may occur for at least a portion of overlapping time, but not necessarily mean identical periods of time. For example, in concurrent transmission, the IAB node may concurrently transmit to both the parent node and the child node. In concurrent reception, both the parent node and the child node may transmit concurrently to the IAB nodes. However, concurrent transmissions may incur interference at the receiving end. For example, concurrent Tx from IAB node to a parent node and a child node may result in interference that is experienced at both the parent and child nodes. Similarly, concurrent Rx from the parent and child nodes to the IAB node may result in interference at the IAB node.

In some aspects, the IAB node may dynamically adjust the access link timing based on a selected operational mode (e.g., for facilitating non-current Tx/Rx, concurrent Tx, or concurrent Rx). Current systems fail to address the dynamic timing adaptation that is provided by features of the present disclosure. Specifically, in some examples, the IAB node may be configured to operate in one or more operational modes based on the type of scheduled communication at the IAB, and thus adjusts the access link timing to adjust for the selected mode. For example, in a first operational mode (e.g., "baseline mode"), the IAB node may align access link timing (slot boundaries) based on the network reference time that may be known or shared by all nodes in the wireless communication system. The first operational mode may be used for non-concurrent Tx/Rx scenarios, where the transmission or reception for backhaul and access link may be configured by time division multiplexing (TDM). Additionally, in a second operational mode, the IAB node may align the access link timing with the backhaul uplink Tx timing. The second operational mode may be used for concurrent Tx scenarios for the IAB node in order to maximize the benefit of interference coordination. Further, in a third operational mode, the IAB node may align access link timing with backhaul downlink Rx timing. The third operational mode may be used for concurrent Rx scenarios.

Thus, in accordance with aspects of the present disclosure, the IAB node may dynamically adjust the timing for access link (e.g., symbol or slot granularity) based on the IAB node operational mode. Features of the present disclosure provide techniques for signaling to one or more child nodes the decision by the IAB node of mode selection (e.g., when the IAB node may change the operational mode), in addition to the timing advance value associated with each operational mode. Specifically, a scheduling entity (e.g., IAB node) may indicate the Tx timing to the scheduled entity (e.g., child node) through timing-advance (TA) command in media access control (MAC) control element (MAC-CE). In turn, starting with an open loop timing estimate, the scheduled entity (e.g., child node) may advance or retard its Tx timing based on the timing-advance command (close-loop time control). Ideally, the timing advance value at the child node may be represented by Equation 1 below:

$$T_{TA} = 2 \cdot T_{p\_ACC} \quad \text{Equation 1}$$

In the above example, the $T_{TA}$ may be a timing advance value, while $T_{p\_ACC}$ may be time associated with the access propagation delay (e.g., time for data to travel from the IAB node to the child node and back). However, due to the capabilities of the IAB node to dynamically adjust the timing for access link in accordance with aspects of the present disclosure, the IAB node may further provide a timing offset value ($T_{offset}$) that may affect the $T_{TA}$ value. Specifically, in some examples, upon dynamically adjusting the timing, the IAB node may notify the child node of the updated timing advance based on the value calculated by Equation 2:

$$T_{TA} = T_{TA\_Base} + T_{offset} \quad \text{Equation 2}$$

In Equation 2, the $T_{TA\_Base}$ may be baseline timing (e.g., MAC-CE based timing) maintained by a TA scheme and the $T_{offset}$ may be either a negative, positive, or zero offset value based off of the $T_{TA\_Base}$ based on the timing adjustments performed by the IAB node. In some examples, a set number of different $T_{offset}$ values may be configured (e.g., by radio resource control (RRC) signaling) for the child node where different values may correspond to different IAB operational modes (e.g., first operational mode, second operational mode, or third operational mode). Although the examples here are illustrated with three operational modes, it should be appreciated that any number greater or less than three operational modes may be configured for the IAB node.

For the configured table that includes the set number of different $T_{offset}$ values, a specific value may be indicated to the child node with a scheduling grant (e.g., physical downlink control channel (PDCCH)) for downlink (e.g., physical downlink shared channel (PDSCH)) or uplink (e.g., physical uplink shared channel (PUSCH)) with a field for the dynamic timing indication. In other cases, a slot-by-slot sequence or pattern of $T_{offset}$ values may be assigned to the child nodes, and the child node may change the timing according to the sequence. Thus, the sequence/pattern may be configured (e.g., by RRC signaling) and triggered by MAC-CE or downlink control information (DCI).

Various aspects are now described in more detail with reference to the FIGS. 1-9. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100 for access link timing management at an IAB node 150. The wireless communications system 100 may include one or more base stations 102, one or more UEs 104, and a core network, such as an Evolved Packet Core (EPC) 180 and/or a 5G core (5GC) 190. The one or more base stations 102 and/or UEs 104 may operate according to millimeter wave (mmW or mmWave) technology. For example, mmW technology includes transmissions in mmW frequencies and/or near mmW frequencies. Specifically, extremely high frequency (EHF) is part of the radio frequency (RF) in the electromagnetic spectrum where the EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave.

As noted above, communications using the mmW and/or near mmW radio frequency band have extremely high path loss and a short range. Thus, the propagation characteristics of the mmWave environment demands deployment of dense gNBs 102 (i.e., base stations 102 in NR technology) to guarantee line-of-sight links at any given time and decrease the probability of outage. However, providing each such gNBs 102 with a wired backhaul link 132 may not be economically feasible. Thus, an alternative wireless backhaul 164 has been considered that utilizes IAB nodes 150 for facilitating 5G communications.

In some examples, the IAB nodes 150 may include both gNB-type functionality and the UE-type functionality. The IAB nodes 150 afford the wireless communications system 100 flexibility such that only a fraction of gNBs (e.g., base stations 102-a, 102-b) may be equipped with a traditional fiber-like wired 132 backhaul capabilities, while the rest of the gNBs (e.g., IAB nodes 150) may act as relays that are connected to the fiber infrastructures wirelessly 164, possibly through multiple hops. In some examples, the one or more IAB nodes 150 may include a timing management component 850 (see FIG. 8) for dynamically adjusting the access link timing at the IAB node 150 based on the operational modes of the IAB node 150 and signaling the timing advance value, including timing offset values to the one or more child nodes to synchronize communication between the IAB node 150 and the one or more child nodes.

The EPC 180 and/or the 5GC 190 may provide user authentication, access authorization, tracking, internet protocol (JP) connectivity, and other access, routing, or mobility functions. The base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC 180 or the 5GC 190), with one another over backhaul links 132, 134 (e.g., Xn, X1, or X2 interfaces) which may be wired or wireless communication links.

The base stations 102 may wirelessly communicate with the UEs 104 via one or more base station antennas. Each of the base stations 102 may provide communication coverage for a respective geographic coverage area 110. In some examples, base stations 102 may be referred to as a base transceiver station, a radio base station, an access point, an access node, a radio transceiver, a NodeB, eNodeB (eNB), gNB, Home NodeB, a Home eNodeB, gNodeB (gNB), a relay, a transceiver function, a basic service set (BSS), an extended service set (ESS), a transmit reception point (TRP), or some other suitable terminology. The geographic coverage area 110 for a base station 102 may be divided into sectors or cells making up only a portion of the coverage area (not shown). The wireless communication network 100 may include base stations 102 of different types (e.g., macro base stations 102 or small cell base stations 180, described below).

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. The wireless communication network 100 may be a heterogeneous technology network in which different types of base stations provide coverage for various geographical regions. For example, each base station 102 may provide communication coverage for a macro cell, a small cell, or other types of cell. The term "cell" is a 3GPP term that may be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 104 with service subscriptions with the network provider. A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 104 with service subscriptions with the network provider. A femto cell may also cover a small geographic area (e.g., a home) and may provide restricted access and/or unrestricted access by UEs 104 having an association with the femto cell (e.g., in the restricted access case, UEs 104 in a closed subscriber group (CSG) of the base station 102, which may include UEs 104 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 104 may be dispersed throughout the wireless communication network 100, and each UE 104 may be stationary or mobile. A UE 104 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 104 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Some non-limiting examples of UEs 104 may include a session initiation protocol (SIP) phone, a satellite radio, a global positioning system, a multimedia device, a video device, a digital audio player (e.g., MP3 player), a camera, a game console, a smart device, a wearable device, a vehicle, an electric meter, a gas pump, a large or small kitchen appliance, a healthcare device, an implant, a sensor/actuator, a display, or any other similar functioning device. Additionally, a UE 104 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 104 may be able to communicate with various types of base stations 102 and network equipment including macro eNBs, small cell eNBs, macro gNBs, small cell gNBs, gNB, relay base stations, and the like.

UE 104 may be configured to establish one or more wireless communication links 120 with one or more base stations 102. The wireless communication links 120 shown in wireless communication network 100 may carry uplink (UL) transmissions from a UE 104 to a base station 102, or downlink (DL) transmissions, from a base station 102 to a UE 104. Each wireless communication link 120 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 120 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 120 may represent one or more broadcast channels.

In some aspects of the wireless communication network 100, base stations 102 or UEs 104 may include multiple antennas for employing antenna diversity schemes to improve communication quality and reliability between base stations 102 and UEs 104. Additionally or alternatively, base stations 102 or UEs 104 may employ multiple input multiple output (MIMO) techniques that may take advantage of multi-path environments to transmit multiple spatial layers carrying the same or different coded data.

Wireless communication network 100 may also support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 104 may be configured with multiple downlink CCs and one or more uplink CCs for carrier aggregation. Carrier aggregation may be used with both FDD and TDD component carriers. The communication links 120 may use multiple-input and multiple-output (MIMO) antenna technology, including spatial multiplexing, beamforming, and/or transmit diversity. The base stations 105 and/or UEs 110 may use spectrum up to Y MHz (e.g., 5, 10, 15, 20, 30, 50, 100, 200, 400, etc., MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 138. The D2D communication link 138 may use the DL/UL WWAN spectrum. The D2D communication link 138 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communication network 100 may further include base stations 102 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

The small cell may operate in a licensed and/or an unlicensed frequency spectrum. When operating in an unlicensed frequency spectrum, the small cell may employ NR and use the same 5 GHz unlicensed frequency spectrum as used by the Wi-Fi AP. The small cell, employing NR in an unlicensed frequency spectrum, may boost coverage to and/or increase capacity of the access network.

In a non-limiting example, the EPC 180 may include a Mobility Management Entity (MME) 181, other MMES 182, a Serving Gateway 183, a Multimedia Broadcast Multicast Service (MBMS) Gateway 184, a Broadcast Multicast Service Center (BM-SC) 185, and a Packet Data Network (PDN) Gateway 186. The MME 181 may be in communication with a Home Subscriber Server (HSS) 187. The MIME 181 is the control node that processes the signaling between the UEs 110 and the EPC 180. Generally, the MME 181 provides bearer and connection management. All user Internet protocol (IP) packets are transferred through the Serving Gateway 183, which itself is connected to the PDN Gateway 186. The PDN Gateway 186 provides UE IP address allocation as well as other functions. The PDN Gateway 186 and the BM-SC 185 are connected to the IP Services 188. The IP Services 188 may include the Internet, an intranet, an IP Multimedia Subsystem (IMS), a PS Streaming Service, and/or other IP services. The BM-SC 185 may provide functions for MBMS user service provisioning and delivery. The BM-SC 185 may serve as an entry point for content provider MBMS transmission, may be used to authorize and initiate MBMS Bearer Services within a public land mobile network (PLMN), and may be used to schedule MBMS transmissions. The MBMS Gateway 184 may be used to distribute MBMS traffic to the base stations 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Figure 2:
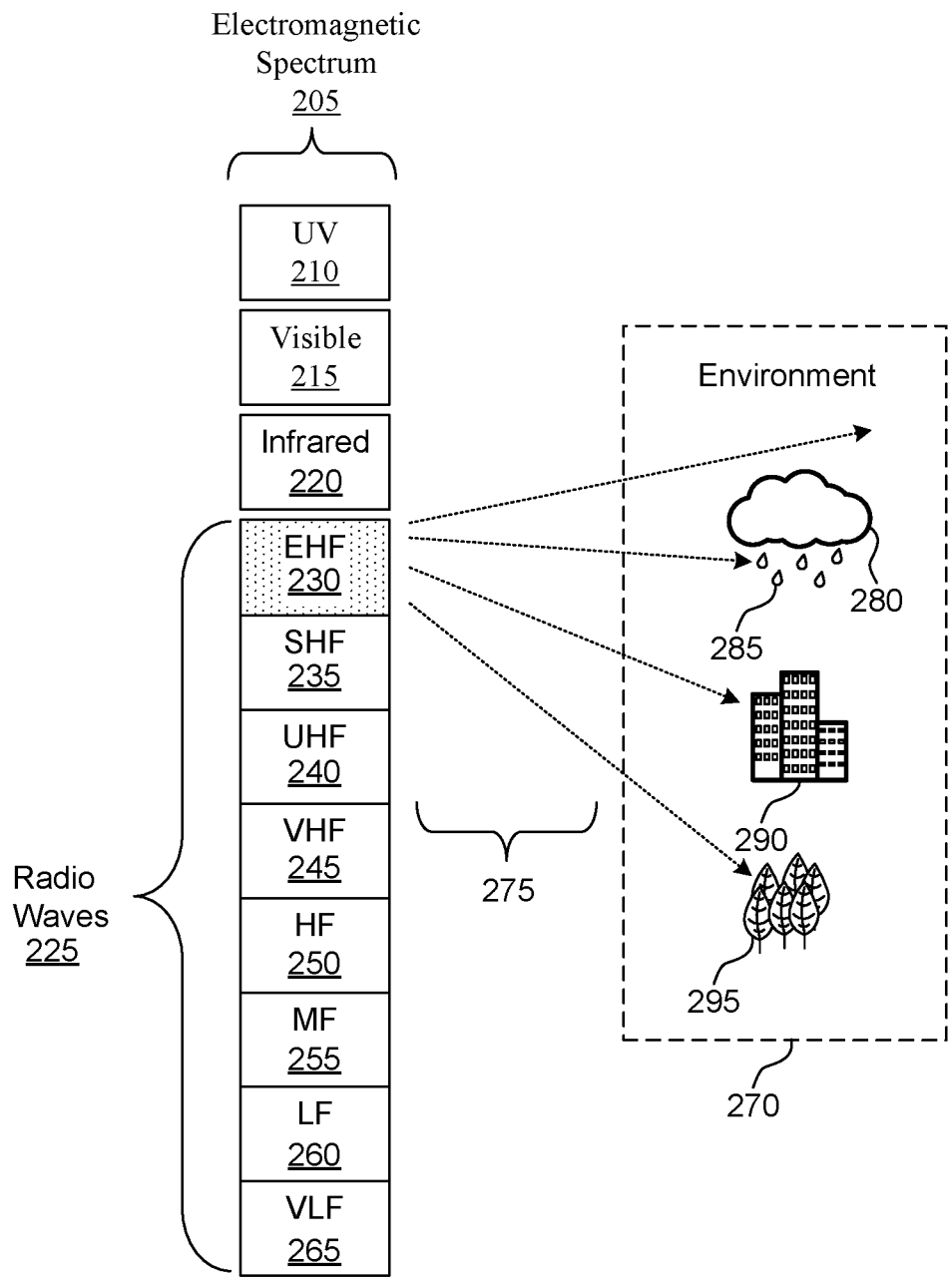
FIG. 2 is an example of a spectrum diagram that illustrates aspects of the frequency range in which some of the communications described herein are performed in accordance with aspects of the present disclosure.

FIG. 2 illustrates a spectrum diagram 200 that illustrates aspects of the frequency range in which some of the communications described herein are performed in accordance with aspects of the present disclosure. Spectrum diagram 200 may include the following components: electromagnetic spectrum 205 and environment 270.

In some examples, electromagnetic spectrum 205 may include the following components: ultra-violet (UV) radiation 210, visible light 215, infrared radiation 220, and radio waves 225. The mmW (or extremely high frequency (EHF)) portion 230 of the electromagnetic spectrum corresponds to electromagnetic radiation with a frequency of 30-300 GHz and a wavelength between 1 mm and 1 cm. Near MMW may extend down to a frequency of 3 GHz with a wavelength of 100 millimeters.

In some examples, radio waves 225 may include the following components: EHF band 230, super high frequency (SHF) band 235, ultra-high frequency (UHF) band 240, very high frequency (VHF) band 245, high frequency (HF) band 250, medium frequency (MF) band 255, low frequency (LF) band 260, and very low frequency (VLF) band 265. The EHF band 230 lies between the SHF band 235 and the far infrared band 220. The SHF band 235 may also be referred to as the centimeter wave band. In some examples, environment 270 may include the following components: mmW radiation 275, atmosphere 280, precipitation 285, obstacle 290 (such as a building), and foliage 295.

In some examples, the wireless communication system 100 may be a mmW communication system. The mmW communication systems may include transmissions in mmW frequencies and/or near mmW frequencies. In mmW communication systems (e.g., access network 100), a line of sight (LOS) may be needed between a transmitting device (e.g., base station 102) and a receiving device (e.g., UE 104), or between two UEs 104. Frequency is very high in mmW communication systems which means that beam widths are very small, as the beam widths are inversely proportional to the frequency of the waves or carriers transmitted by an antenna of the transmitting device. Beam widths used in mmW communications are often termed as "pencil beams." The small wavelengths may result in many objects or materials acting as obstacles including even oxygen molecules. Therefore, LOS between the transmitter and receiver may be required unless a reflected path is strong enough to transmit data.

Thus, while the use of the mmW bands is compelling as the large bandwidths available at these high frequencies enable extremely high data rates and significant increases in capacity, mmW bands are highly susceptible to rapid channel variations and suffer from severe free-space path loss and atmospheric absorption. In other words, at mmW frequencies, even small variations in the environment, such as the turn of the head, movement of the hand, or a passing car may change the channel conditions between the base station and the UE, and thus impact performance.

As such, base stations 102 and/or UEs 104 operating according to the mmW technology may utilize beamforming (see FIG. 3A) in their transmissions to compensate for the extremely high path loss and short range. Particularly, the 5G NR systems may leverage the massive MIMO antenna arrays to create highly directional beams of small wavelengths that focus transmitted RF energy in order to attempt to overcome the propagation and path loss challenges in both the uplink and downlink. In some aspects of the wireless communication network 100, base stations 102 or UEs 104 may include multiple antennas for employing antenna diversity schemes to improve communication quality and reliability between base stations 102 and UEs 104. Thus, the base stations 102 or UEs 104 may employ MIMO techniques that may take advantage of multi-path environments to transmit multiple spatial layers carrying the same or different coded data.

Figure 3:
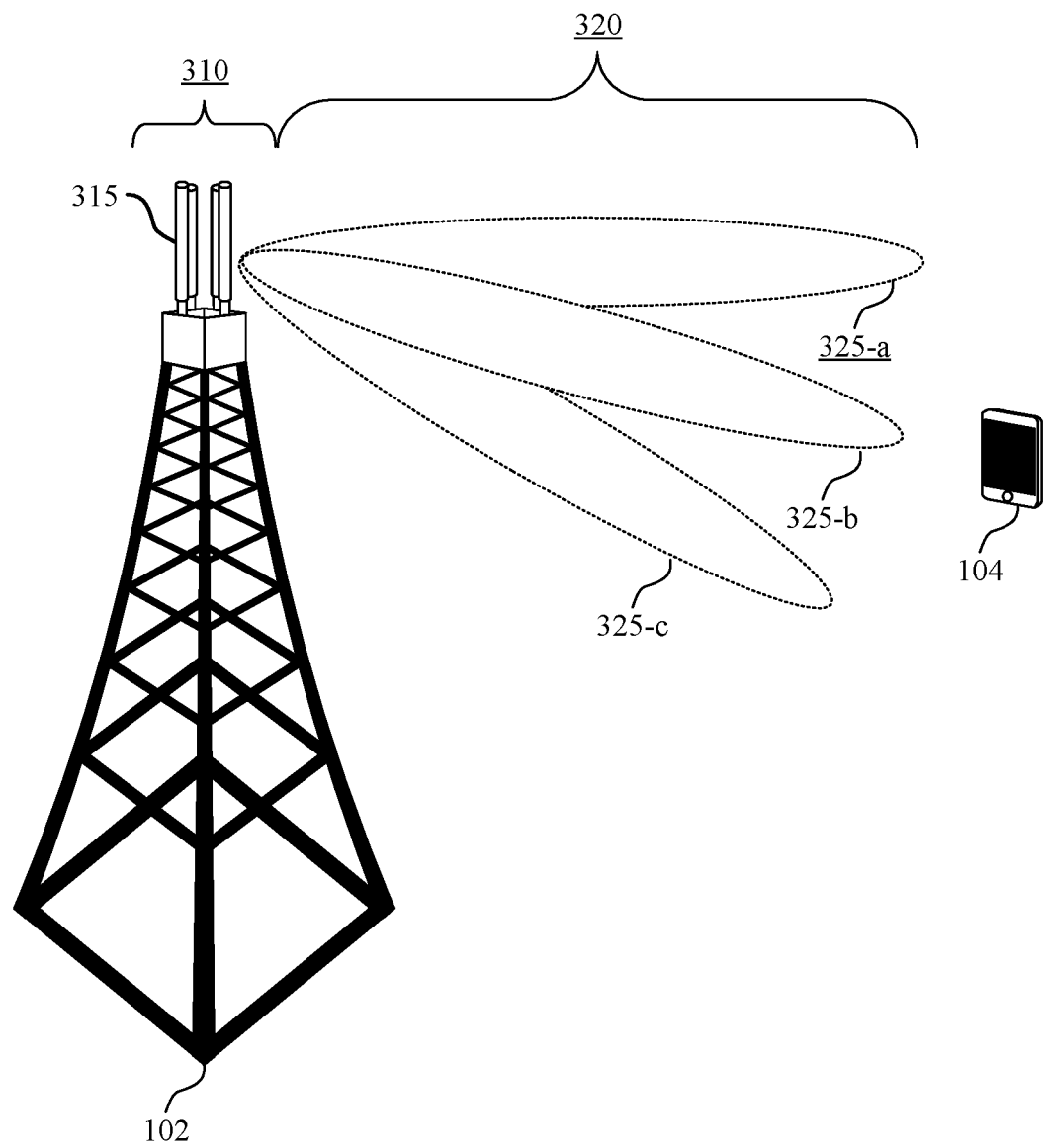
FIG. 3 is an example of a schematic diagram of beamforming in accordance with aspects of the present disclosure.

FIG. 3 illustrates a schematic diagram 300 that supports beamforming in accordance with aspects of the present disclosure. Specifically, beamforming is a technique for directional signal transmission and reception. Schematic diagram 300 illustrates an example of beamforming operations, and may include a base station 102, beamforming array 310, and UE 104.

In some examples, the beamforming array 310 of the base station 102 may include one or more antennas 315 for employing MIMO techniques that may take advantage of multi-path environments to transmit multiple spatial layers carrying the same or different coded data. Beamforming at a transmitter (e.g., base station 102 or UE 104) may involve phase-shifting the signal produced at different antennas 315 in an array to focus a transmission in a particular direction. The phase-shifted signals may interact to produce constructive interference in certain directions and destructive interference in other directions. By focusing the signal power, a transmitter may improve communication throughput while reducing interference with neighboring transmitters.

Similarly, beamforming at a receiver may involve phase-shifting a signal received from different antennas 315. When combining the phase shifted signals, the receiver may amplify a signal from certain directions and reduce the signal from other directions. In some cases, receivers and transmitters may utilize beamforming techniques independently of each other. In other cases, a transmitter and receiver may coordinate to select a beam direction. The use of beamforming may depend on factors such as the type of signal being transmitted and the channel conditions. For example, directional transmissions may not be useful when transmitting to multiple receivers, or when the location of the receiver is unknown. Thus, beamforming may be appropriate for unicast transmissions, but may not be useful for broadcast transmissions. Also, beamforming may be appropriate when transmitting in a high frequency radio band, such as in the mmW band.

Since the beamforming array 310 size is proportional to the signal wavelength, smaller devices (e.g., UEs) may also be capable of beamforming in high frequency bands. Also, the increased receive power may compensate for the increased path loss at these frequencies. In some examples, beamforming pattern 320 may include one or more beams 325, which may be identified by individual beam IDs (e.g., first beam 325-a, second beam 325-b, third beam 325-c, etc.).

Figure 4A:
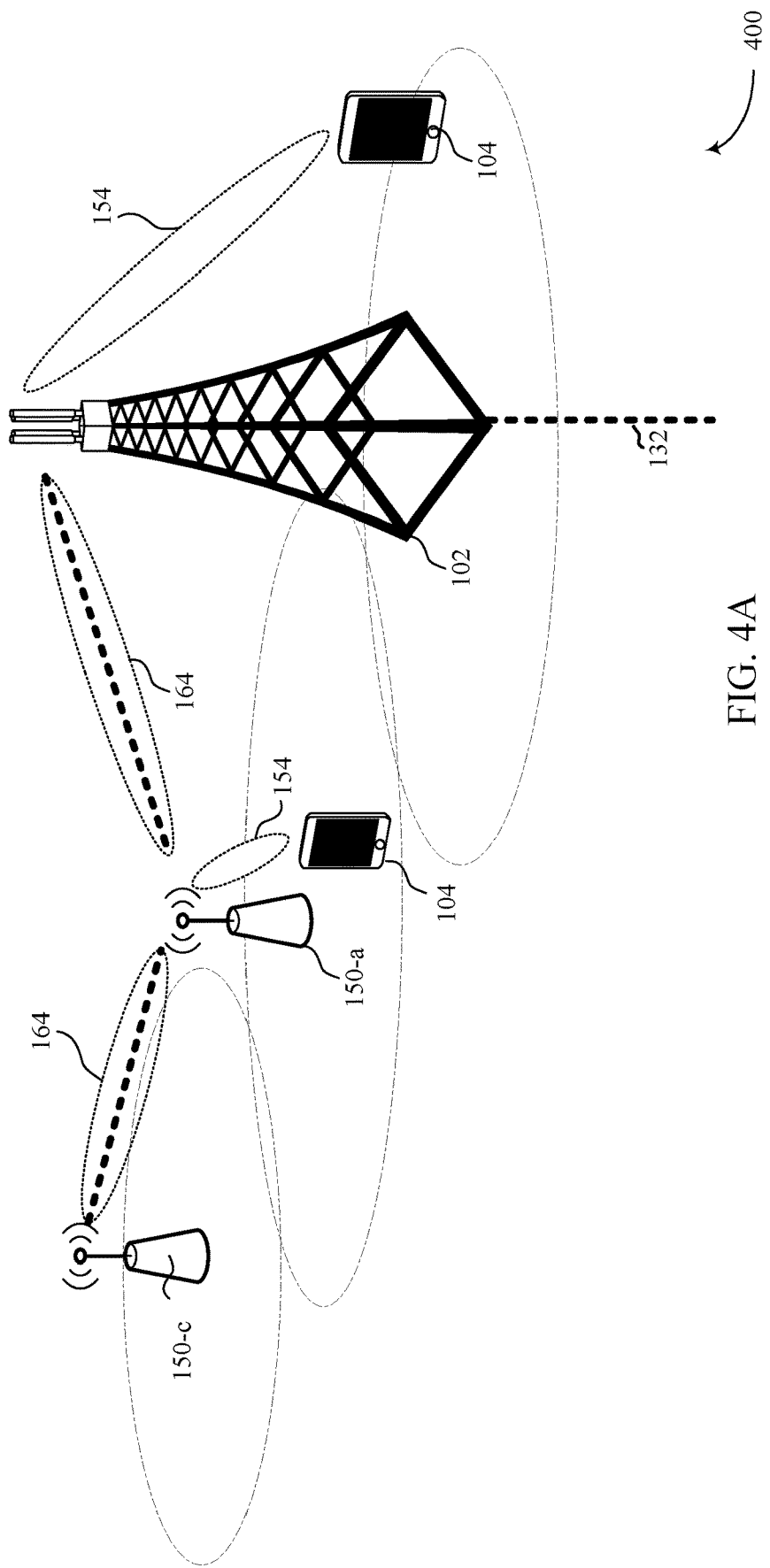
FIGS. 4A and 4B are a schematic diagram of an example wireless communication system for coordinating between one or more IAB nodes and parent and child nodes in accordance with aspects of the present disclosure.
Figure 4B:
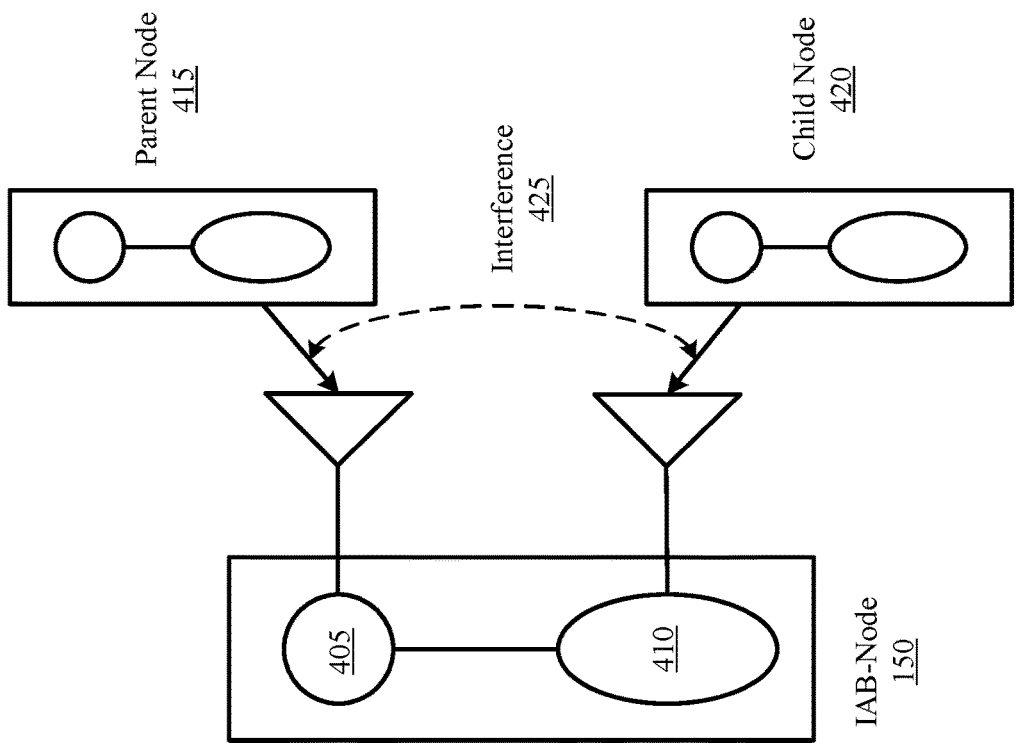
Figure 4B:
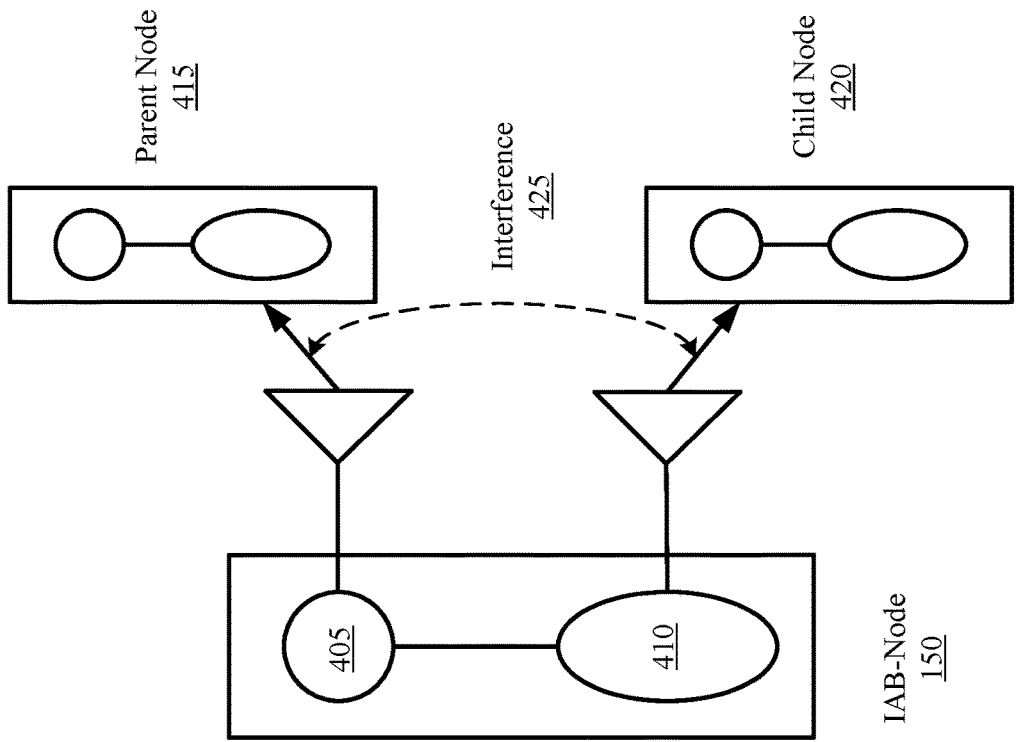

Referring to FIGS. 4A and 4B, schematic diagrams 400 and 450 include examples of wireless communication systems that employ mmW communication in accordance with aspects of the present disclosure. The diagram 400 illustrates one or more of base stations 102 that may include traditional wired (e.g., via cable or optical fiber) backhaul capabilities 132 in addition to one or more IAB nodes, such as IAB node 150-a and IAB node 150-c, which may not have the wired backhaul capability 132 and thus utilize wireless communication 164 with base station 102 to define a wireless backhaul capability. Also, base station 102 and/or IAB nodes 150 and 150 may serve one or more UEs 104 via respective wireless communication links 154. In this case, IAB node 150-a may be referred to as a relay node based on IAB node 150-a wirelessly connecting IAB node 150-b to the wired backhaul capability 132 of base station 102. In addition, referring specifically to FIG. 4B, the diagram 450 includes one or more IAB nodes 150 that may provide both the UE-type functionality 405 and gNB-type functionality 410, as is discussed here contemporaneously with discussion on FIG. 4A.

The UE-type functionality 405 of the IAB node 150 may allow for transmission and reception of signals to and from parent node 415 (e.g., gNB 102 or another IAB node 150) through backhaul links. Conversely, the gNB-type functionality 410 of the IAB node 150 may allow for transmission and reception of signals to and from child nodes 420 (e.g., UE 104 or another IAB node 150) through an access link. As noted above, the IAB functionalities of the IAB node 150 may be characterized by (i) the utilization of the mmWave spectrum; (ii) the integration of the access and backhaul technologies (i.e., using the same spectral resources and infrastructures to serve both mobile terminals in access as well as the NR gNBs in backhaul); (iii) the possibility of deploying plug-and-play IAB nodes capable of self-configuring and self-optimizing themselves.

In some examples, IAB nodes 150 may allow concurrent transmission or reception for higher resource efficiency. For example, in concurrent transmission (see FIG. 4B, "Concurrent UL and DL Tx"), the IAB node 150 may concurrently transmit to both the parent node 415 and the child node 420. In concurrent reception (see FIG. 4B, "Concurrent DL and UL Rx"), both the parent node 415 and the child node 520 may transmit concurrently to the IAB nodes 150. However, concurrent transmissions may incur interference 425 at the receiving end. For example, concurrent Tx from IAB node 150 to a parent node 415 and a child node 420 may result in interference 425 that is experienced at both the parent node 415 and child nodes 420. Similarly, concurrent Rx from the parent node 415 and child nodes 420 to the IAB node 150 may result in interference 425 at the IAB node 150.

Features of the present disclosure implement techniques for interference management for concurrent downlink and uplink Tx/Rx at an IAB node 150. In accordance with one example, the transmit power or beam direction for downlink and uplink Tx/Rx may be dynamically adjusted to account for the experienced interference. In other examples, aspects of the present disclosure provide techniques for coordinated management of resources (e.g., reference signal resources such as DMRS) to be shared between concurrent downlink and uplink Tx/Rx in an orthogonal manner. However, in some examples, coordinating resources alone may not be sufficient to mitigate the interference.

Thus, in accordance with aspects of the present disclosure, the IAB node 150 may dynamically adjust the timing for an access link (e.g., on symbol or slot basis) based on the operational mode of the IAB node 150. Features of the present disclosure provide techniques for the IAB node 150 signaling to one or more child nodes 420 the mode selection (e.g., when the IAB node 150 may change the operating mode), in addition to the timing advance value associated with each mode. Specifically, the IAB node 150 may provide a timing offset value ($T_{offset}$) that may affect the $T_{TA}$ value for the child node 420 based on the adjustment of operational mode at the IAB node 150.

Figure 5A:
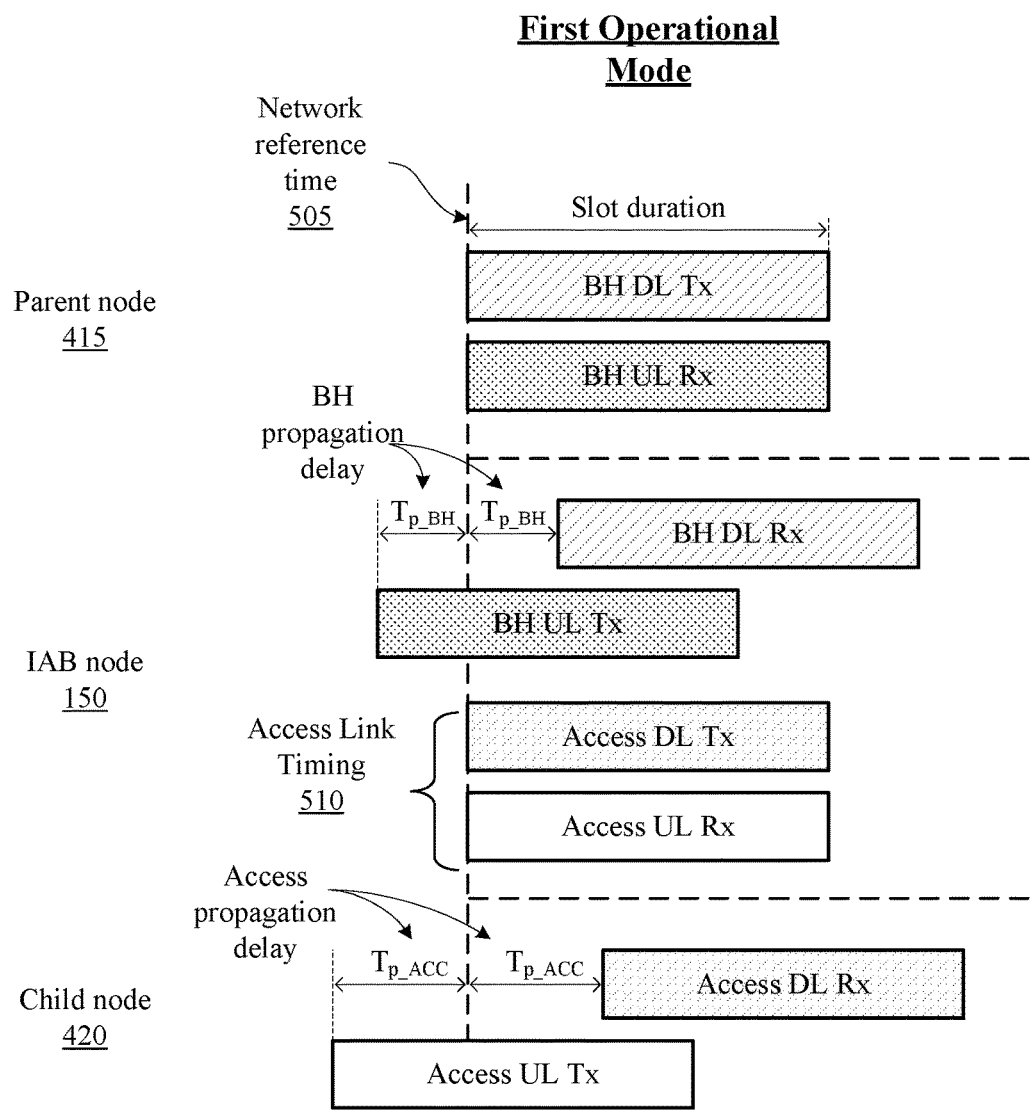
FIG. 5A is an example of a timing diagram of the first operational mode of the IAB node in accordance with aspects of the present disclosure.
Figure 5B:
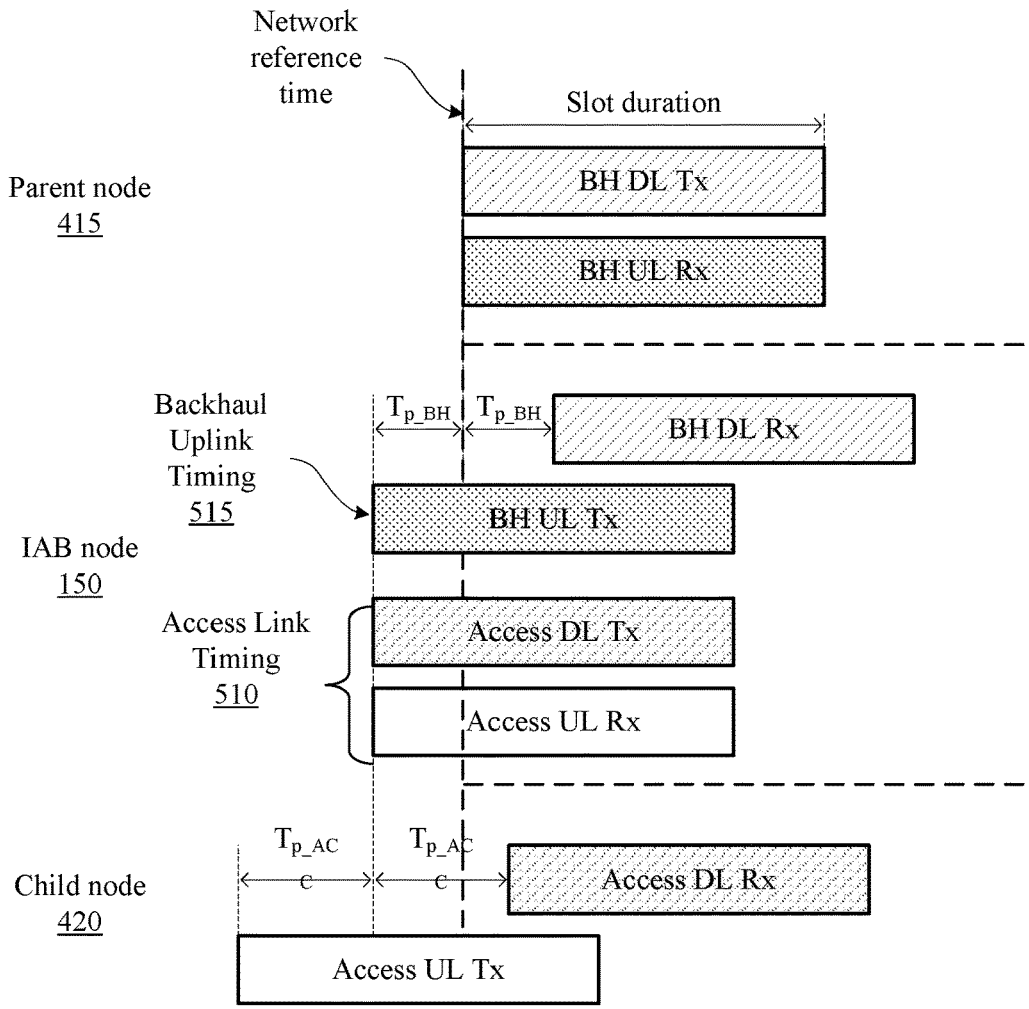
FIG. 5B is an example of a timing diagram of the second operational mode of the IAB node in accordance with aspects of the present disclosure.
Figure 5C:
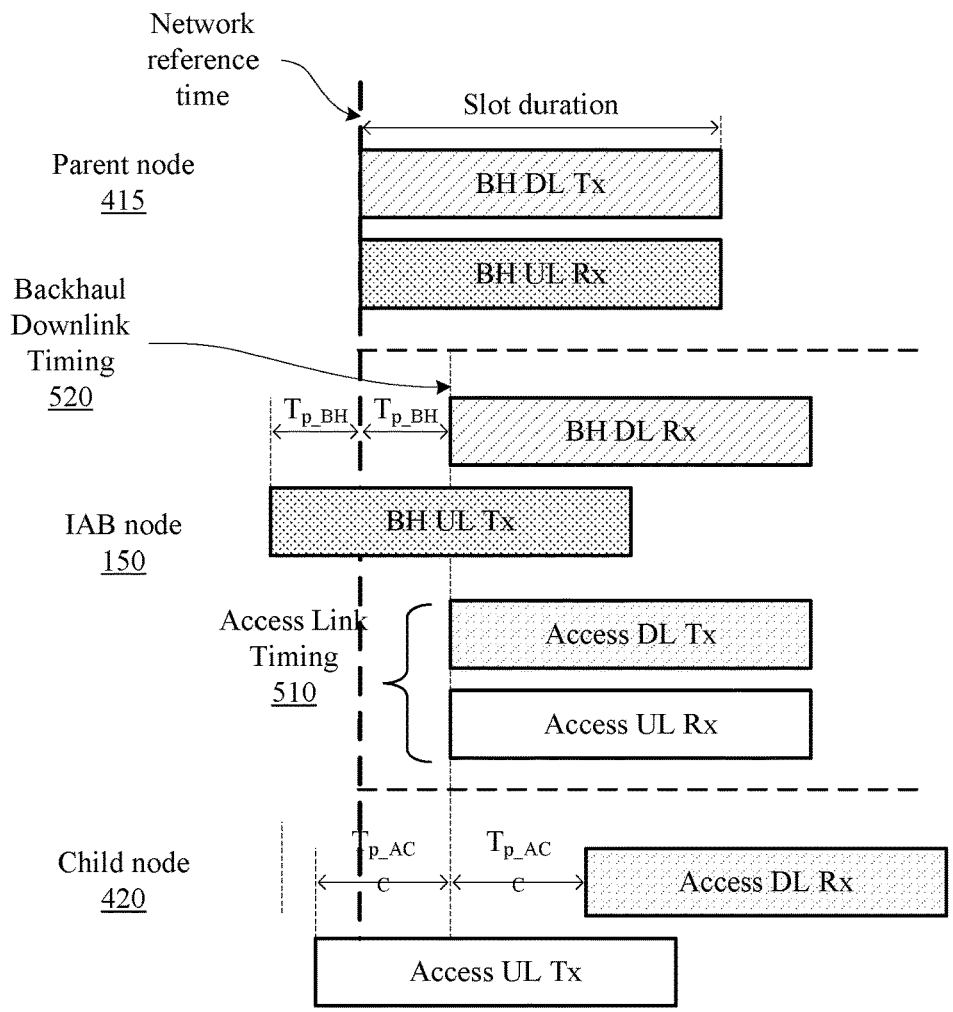
FIG. 5C is an example of a timing diagram of the third operational mode of the IAB node in accordance with aspects of the present disclosure.

FIG. 5A-5C are timing diagrams of three operational modes in accordance with aspects of the present disclosure whereby the IAB node 150 may align the access link timing based on the operational mode. The timing diagrams may indicate the time for the parent node 415, the IAB node 150, and/or the child node 420 to transmit or receive signals. Different operational modes are associated with different gap values ($T_{GAP}$) separating the Access DL Tx from the BH DL Rx. For example, in FIG. 5A, the parent node 415 may transmit and receive data during the same slot timing (i.e., starting at the network reference time 505). The IAB node 150 may transmit uplink data to the parent node 415 at a time that is $T_{p\_BH}$ before the network reference time 505. The IAB node 150 may receive downlink data from the parent node 415 at a time that is $T_{p\_BH}$ after the network reference time 505.

In some implementations, for the backhaul links shown in FIG. 5A, the IAB node 150 may transmit the BH UL Tx at $T_{p\_BH}$ before the network reference time 505. The BH UL Tx may arrive at the parent node 415 at the network reference time 505 as BH UL Rx. The parent node 415 may transmit the BH DL Tx at the network reference time 505. The BH DL Tx may arrive at the IAB node 150 at $T_{p\_BH}$ after the network reference time 505 as BH DL Rx. The duration $T_{p\_BH}$ may be the propagation delay between the parent node 415 and the IAB node 150.

In some implementations, for the access links shown in FIG. 5A, the child node 420 may transmit the Access UL Tx at $T_{p\_ACC}$ before the network reference time 505. The Access UL Tx may arrive at the IAB node 150 at the network reference time 505 as Access UL Rx. The IAB node 150 may transmit the Access DL Tx at the network reference time 505. The Access DL Tx may arrive at the child node 420 at $T_{p\_ACC}$ after the network reference time 505 as Access DL Rx. The BH DL Tx, BH UL Rx, BH DL Rx, BH UL Tx, Access DL Tx, Access UL Rx, Access DL Rx, and Access UL Tx may last a slot duration. The duration $T_{p\_ACC}$ may be the propagation delay between the child node 420 and the IAB node 150.

In some implementations, for the access links shown in FIG. 5B, the child node 420 may transmit the Access UL Tx at a time earlier than $T_{p\_ACC}$ before the network reference time 505. The Access UL Tx may arrive at the IAB node 150 after $T_{p\_ACC}$ and before the network reference time 505 as Access UL Rx. The IAB node 150 may transmit the Access DL Tx before the network reference time 505. The Access DL Tx may arrive at the child node 420 after $T_{p\_ACC}$ as Access DL Rx.

In certain implementations, for the access links shown in FIG. 5C, the child node 420 may transmit the Access UL Tx before the network reference time 505. The Access UL Tx may arrive at the IAB node 150 after $T_{p\_ACC}$ and after the network reference time 505 as Access UL Rx. The IAB node 150 may transmit the Access DL Tx after the network reference time 505. The Access DL Tx may arrive at the child node 420 after $T_{p\_ACC}$ as Access DL Rx.

For example, FIG. 5A is a timing diagram 500 of the first operational mode of the IAB node 150 that may align access link timing 510 (slot boundaries) based on the network reference time 505 that may be known or shared by all nodes in the wireless communication system. The first operational mode may be used by the IAB node 150 for non-concurrent Tx/Rx scenarios, where the transmission or reception for backhaul and access link may be configured by TDM.

FIG. 5B is a timing diagram 525 of the second operational mode of the IAB node 150 to align the access link timing 510 with the backhaul uplink Tx timing 515. The second operational mode may be used for concurrent Tx scenarios for the IAB node 150 in order to maximize interference management. FIG. 5C is a timing diagram 550 of the third operational mode of the IAB node 150 to align the access link timing 510 with backhaul downlink Rx timing 520. The third operational mode may be used for concurrent Rx scenarios.

Thus, in accordance with aspects of the present disclosure, the IAB node 150 may be configured to dynamically adjust the access link timing based on a selected operational mode (e.g., for facilitating non-current Tx/Rx, concurrent Tx, or concurrent Rx). Specifically, in some examples, the IAB node may be configured to operate in one or more operational modes based on the type of scheduled communication at the IAB node 150, and thus adjust the access link timing to adjust for the selected mode.

Figure 6:
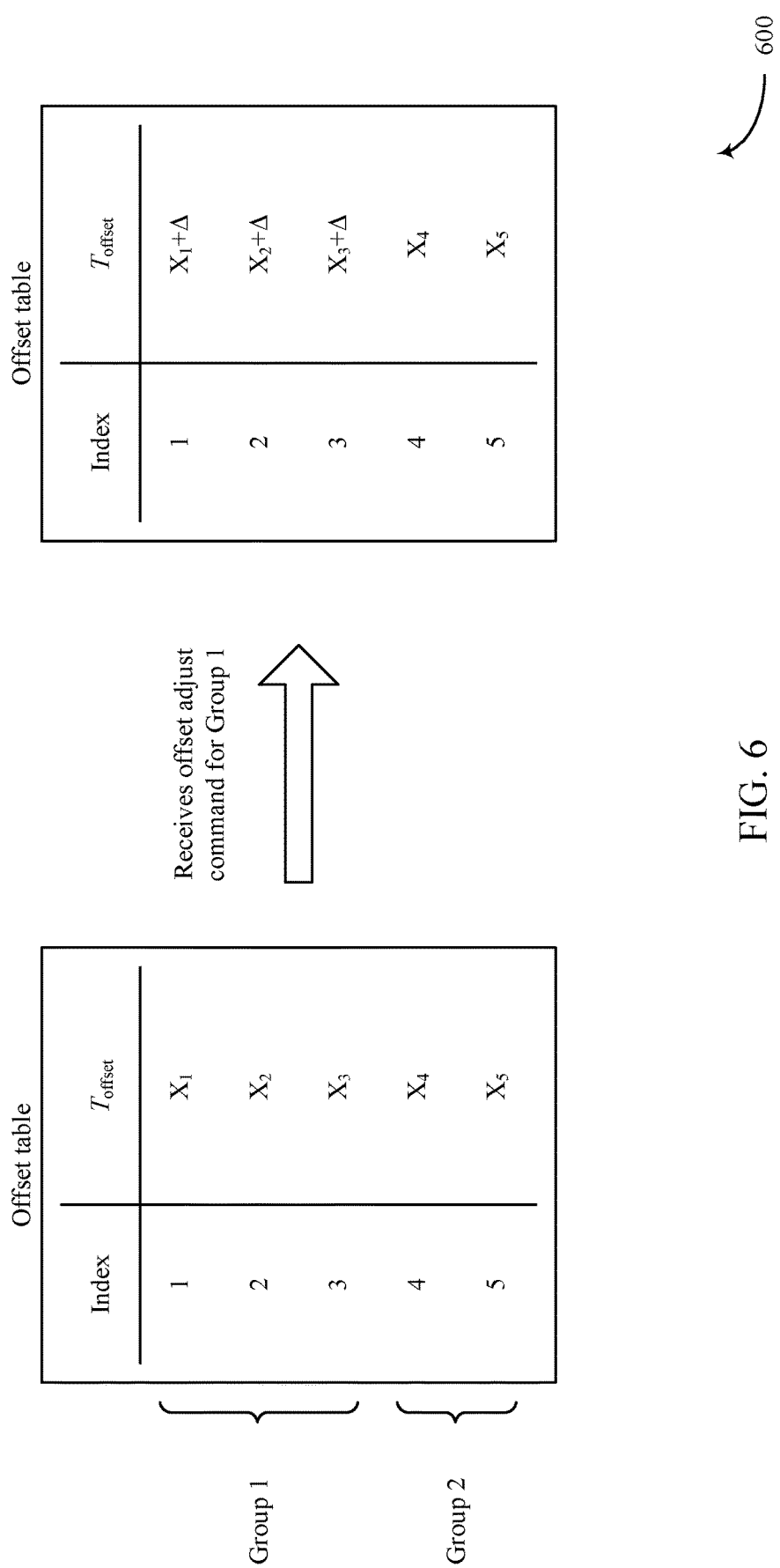
FIG. 6 is an example of a configurable table that includes a set number of different timing offset values that may be configured by the IAB node in accordance with aspects of the present disclosure.

FIG. 6 is a configurable table 600 that includes a set number of different $T_{offset}$ values that may be configured by the IAB node 150 (e.g., by RRC signaling) for the child node where different values may correspond to different IAB operational modes (e.g., first operational mode, second operational mode, or third operational mode). For the configured table 600 that includes the set number of different $T_{offset}$ values, a specific value, or the index in the table, may be indicated to the child node with a scheduling grant (e.g., PDCCH) for downlink (e.g., PDSCH) or uplink (e.g., PUSCH) with a field for the dynamic timing indication. In an non-limiting example, the IAB node 150 may transmit one or more $T_{offset}$ values, as indicated by the indices, to the child node 420 to indicate the different timing adjustments to be implemented by the child node 420.

For some physical signals (e.g., aperiodic CSI-RS or SRS), the triggering DCI may include the dynamic timing indication. Additionally or alternatively, for some physical channels or bandwidth part (BWP), the RRC signaling or MAC-CE may be used to assign a set of timing offset values to the child node. For control channel (e.g., PDCCH), the RRC configuration for control resource set (CORESET) may include a parameter for timing offset. In other cases, a slot-by-slot sequence or pattern of $T_{offset}$ values may be assigned to the child nodes, and each child node may change the timing according to the sequence. Thus, the sequence/pattern may be configured (e.g., by RRC signaling) and triggered by MAC-CE or DCI.

Thus, while the MAC-CE based TA scheme may adjust the $T_{TA\_base}$ value, the $T_{offset}$ values may be adjusted separately by the IAB node. In some examples, adjustment for the $T_{offset}$ values may not be needed as frequently as the adjustment for the $T_{TA\_base}$ because the mobility of IAB nodes may be limited (e.g., constant propagation delay between parent and IAB nodes). As such, RRC reconfiguration or MAC-CE signaling may be used to adjust the $T_{offset}$ values when the IAB node adjusts its operational mode or environment.

Additionally or alternatively, as illustrated in the configurable table 600, the set of N $T_{offset}$ values may be grouped into multiple subsets of at least one element (or overlapping elements) such that an offset adjustment command may include a group index that the command will be applied.

To this end, the child node may indicate its capabilities for dynamic timing adjustment to the IAB node such that IAB node may modify the operational mode transitions accordingly (i.e., the IAB node may determine which operational mode to utilize based on the capabilities of the child node). For example, the child node may transmit information such as maximum supported number of $T_{offset}$ values of the child nodes and the range of each offset value, the radio frequency (RF)/intermediate frequency (IF) retuning latency or downlink-uplink switching latency of the child node. The capabilities may be included in the UE capability report or in the RRC signaling/MAC-CE that may be transmitted from the child node to the IAB node. In some examples, the child node may also report the estimated propagation delay from the IAB node. Thus, based on the RF/IF retuning latency and the propagation delay, the IAB node may determine the length of a guard period to include between the two time alignments when switching between different operational modes.

Figure 7:
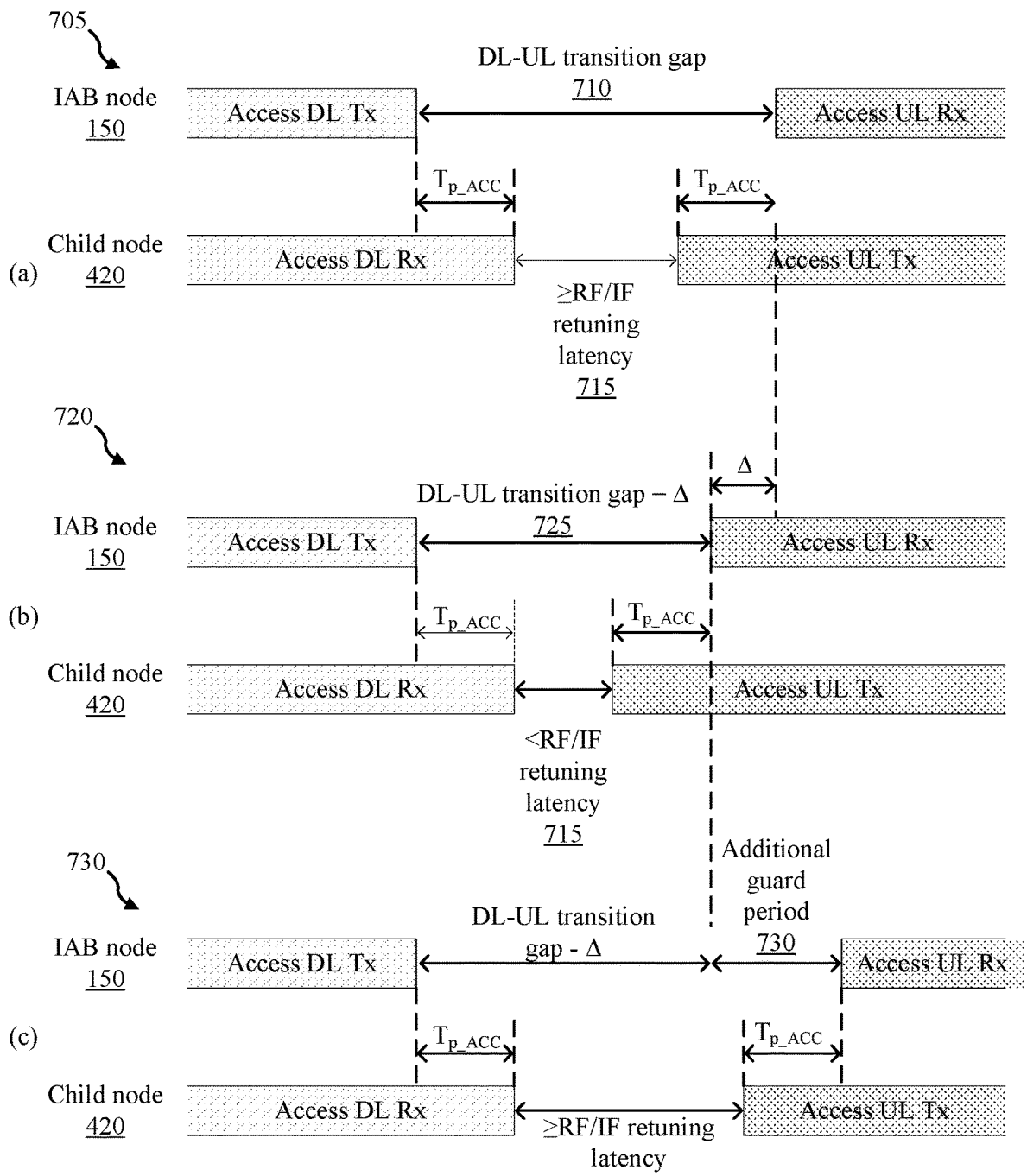
FIG. 7 is an example of a timing diagram of inclusion of guard periods by an IAB node for the child node, when the IAB node elects to dynamically switch its operational modes that affect the timing alignment of the child node.

FIG. 7 is a timing diagram 700 of inclusion of guard periods by an IAB node for the child node during transitions from operational modes that affect the timing alignment of the child node. In order to minimize data loss during transition between downlink and uplink (or vice versa), the downlink-uplink (DL-UL) transition gap 710 for the access link at the IAB node 150 should ideally be larger than or equal to the round-trip propagation delay plus the RF/IF retuning latency 715 of the child node 420, as illustrated in scenario 705. However, if the IAB node 150 dynamically adjusts the access link timing such that the access uplink Rx occurs earlier than previously scheduled (e.g., Δ time), as in scenario 720, the downlink-uplink transition gap—Δ 725 time may be reduced to be less than the RF/IF retuning latency 715 of the child node 420. Such transition may generally cause loss of data because the transceiver of the child node 420 may not switch from downlink to uplink transition in sufficient time, thereby missing portion of the transmission opportunity.

Figure 8:
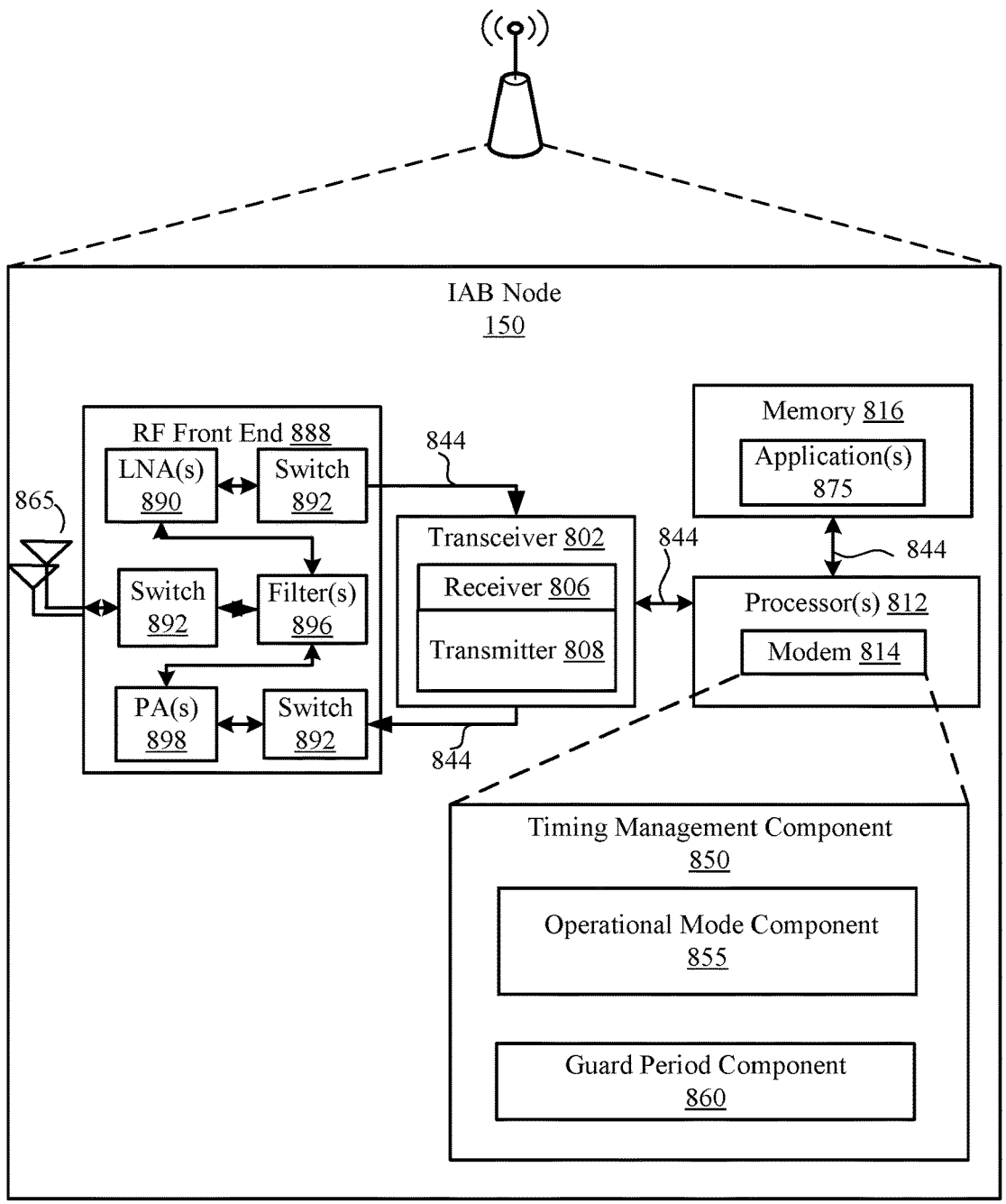
FIG. 8 is a schematic diagram of an example implementation of various components of an IAB node in accordance with various aspects of the present disclosure.

Thus, to address this problem, features of the present disclosure provide techniques for determining a guard period 730 between two zones (e.g., downlink and uplink) that may be included in the access link timing in order to ensure that the child node 420 has sufficient time to make transition between the timings FIG. 8 illustrates a hardware components and subcomponents of a device that may be IAB node 150 for implementing one or more methods (e.g., method 900) described herein in accordance with various aspects of the present disclosure. For example, one example of an implementation of the IAB node 150 may include a variety of components, some of which have already been described above, but including components such as one or more processors 812, memory 816 and transceiver 802 in communication via one or more buses 844, which may operate in conjunction with the timing management component 850 to perform functions described herein related to including one or more methods (e.g., 900) of the present disclosure.

In some examples, the timing management component 850 may include an operational mode component 855 for dynamically adjusting the access link timing based on a selected operational mode (e.g., for facilitating non-current Tx/Rx, concurrent Tx, or concurrent Rx). Specifically, in some examples, the IAB node 150 may be configured to operate in one or more operational modes based on the type of scheduled communication at the IAB 150, and thus adjust the access link timing to adjust for the selected mode. For example, in a first operational mode (e.g., "baseline mode"), the IAB node may align access link timing (slot boundaries) based on the network reference time that may be known or shared by all nodes in the wireless communication system. The first operational mode may be used for non-concurrent Tx/Rx scenarios, where the transmission or reception for backhaul and access link may be configured by time division multiplexing (TDM). Additionally, in a second operational mode, the IAB node may align the access link timing with the backhaul uplink Tx timing. The second operational mode may be used for concurrent Tx scenarios for the IAB node in order to maximize interference management. Further, in a third operational mode, the IAB node may align access link timing with backhaul downlink Rx timing. The third operational mode may be used for concurrent Rx scenarios. The timing management component 850 may further include a guard period component 860 for determining length of guard period that ensures that downlink-uplink transition gap at the IAB node 150 exceeds the RF/IF retuning latency of the child node 420.

The one or more processors 812, modem 814, memory 816, transceiver 802, RF front end 888 and one or more antennas 865, may be configured to support voice and/or data calls (simultaneously or non-simultaneously) in one or more radio access technologies. In an aspect, the one or more processors 812 may include a modem 814 that uses one or more modem processors. The various functions related to timing management component 850 may be included in modem 814 and/or processors 812 and, in an aspect, may be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 814 associated with timing management component 850 may be performed by transceiver 802. The one or more antennas 865 may include stand-alone antennas and/or antenna arrays.

The memory 816 may be configured to store data used herein and/or local versions of application(s) 875 or timing management component 850 and/or one or more of its subcomponents being executed by at least one processor 812. The memory 816 may include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, the memory 816 may be a non-transitory computer-readable storage medium that stores one or more computer-executable codes defining timing management component 850 and/or one or more of its subcomponents, and/or data associated therewith, when the IAB node 150 is operating at least one processor 812 to execute timing management component 850 and/or one or more of its subcomponents.

The transceiver 802 may include at least one receiver 806 and at least one transmitter 808. The receiver 806 may include hardware, firmware, and/or software code executable by a processor for receiving data, the code comprising instructions and being stored in a memory (e.g., computer-readable medium). The receiver 806 may be, for example, a radio frequency (RF) receiver. In an aspect, the receiver 806 may receive signals transmitted by at least one UE 104. Additionally, receiver 806 may process such received signals, and also may obtain measurements of the signals, such as, but not limited to, Ec/Io, SNR, RSRP, RSSI, etc. The transmitter 808 may include hardware, firmware, and/or software code executable by a processor for transmitting data, the code comprising instructions and being stored in a memory (e.g., computer-readable medium). A suitable example of the transmitter 808 may including, but is not limited to, an RF transmitter.

Moreover, in an aspect, transmitting device may include the RF front end 888, which may operate in communication with one or more antennas 865 and transceiver 802 for receiving and transmitting radio transmissions, for example, wireless communications transmitted by at least one base station 102, other IAB nodes 150 or wireless transmissions transmitted to and by UE 104. The RF front end 888 may be connected to one or more antennas 865 and may include one or more low-noise amplifiers (LNAs) 890, one or more switches 892, one or more power amplifiers (PAs) 898, and one or more filters 896 for transmitting and receiving RF signals.

In an aspect, the LNA 890 may amplify a received signal at a desired output level. In an aspect, each LNA 890 may have a specified minimum and maximum gain values. In an aspect, the RF front end 888 may use one or more switches 892 to select a particular LNA 890 and its specified gain value based on a desired gain value for a particular application.

Further, for example, one or more PA(s) 898 may be used by the RF front end 888 to amplify a signal for an RF output at a desired output power level. In an aspect, each PA 898 may have specified minimum and maximum gain values. In an aspect, the RF front end 888 may use one or more switches 892 to select a particular PA 898 and its specified gain value based on a desired gain value for a particular application.

Also, for example, one or more filters 896 may be used by the RF front end 888 to filter a received signal to obtain an input RF signal. Similarly, in an aspect, for example, a respective filter 896 may be used to filter an output from a respective PA 898 to produce an output signal for transmission. In an aspect, each filter 896 may be connected to a specific LNA 890 and/or PA 898. In an aspect, the RF front end 888 may use one or more switches 892 to select a transmit or receive path using a specified filter 796, LNA 790, and/or PA 898, based on a configuration as specified by the transceiver 702 and/or processor 812.

As such, the transceiver 802 may be configured to transmit and receive wireless signals through one or more antennas 865 via the RF front end 888. In an aspect, the transceiver 802 may be tuned to operate at specified frequencies such that transmitting device may communicate with, for example, one or more base stations 102 or one or more cells associated with one or more base stations 102. In an aspect, for example, the modem 814 may configure the transceiver 802 to operate at a specified frequency and power level based on the configuration of the transmitting device and the communication protocol used by the modem 814.

In an aspect, the modem 814 may be a multiband-multimode modem, which may process digital data and communicate with the transceiver 802 such that the digital data is sent and received using the transceiver 802. In an aspect, the modem 814 may be multiband and be configured to support multiple frequency bands for a specific communications protocol. In an aspect, the modem 814 may be multimode and be configured to support multiple operating networks and communications protocols. In an aspect, the modem 814 may control one or more components of transmitting device (e.g., RF front end 888, transceiver 802) to enable transmission and/or reception of signals from the network based on a specified modem configuration. In an aspect, the modem configuration may be based on the mode of the modem 814 and the frequency band in use. In another aspect, the modem configuration may be based on UE configuration information associated with transmitting device as provided by the network during cell selection and/or cell reselection.

Figure 9:
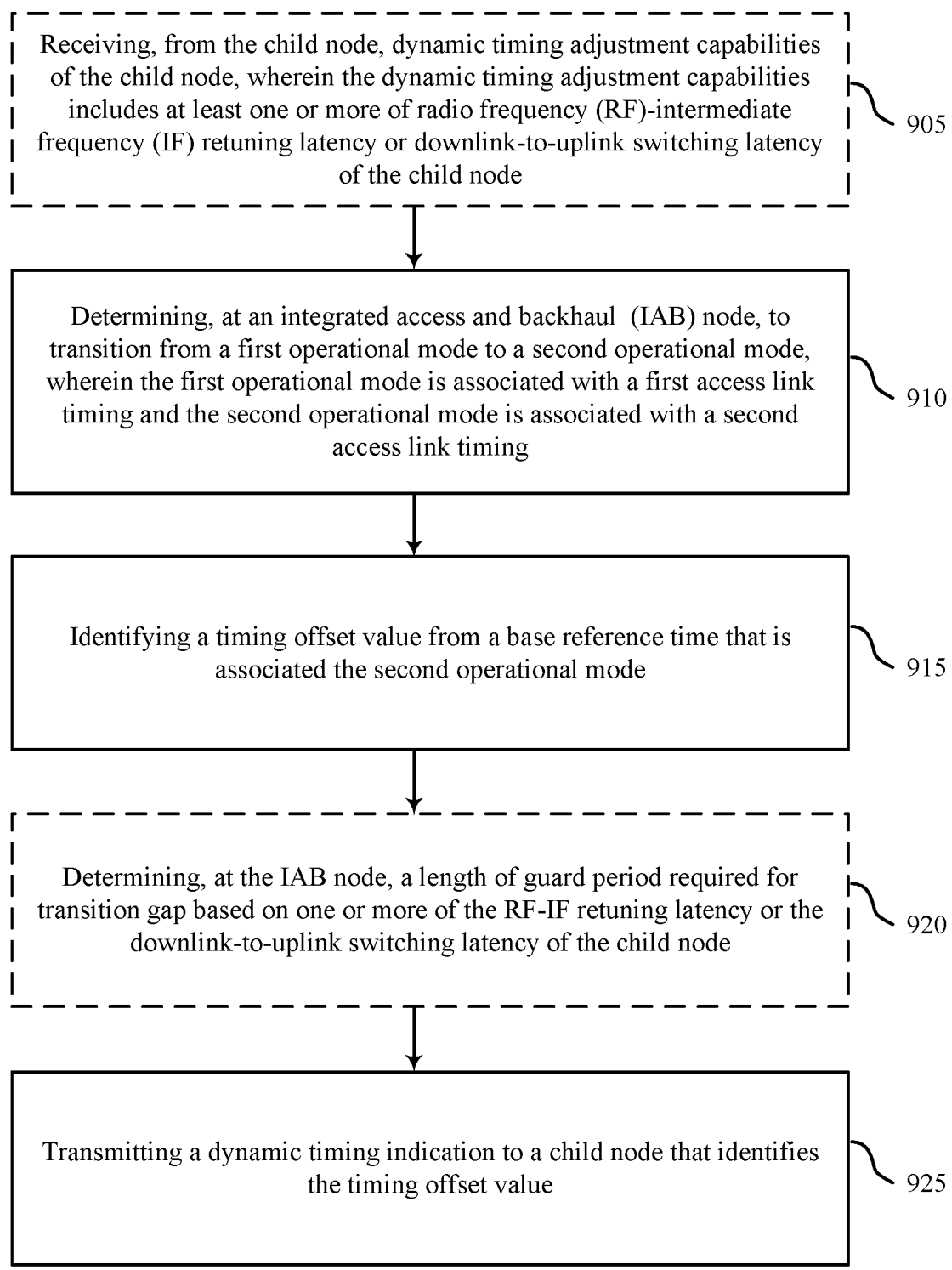
FIG. 9 is a flow diagram of an example of a method of wireless communication implemented by the IAB node in accordance with aspects of the present disclosure.

FIG. 9 is a flowchart of an example method 900 for wireless communications in accordance with aspects of the present disclosure. The method 900 may be performed using the IAB node 150. Although the method 900 is described below with respect to the elements of the IAB node 150, other components may be used to implement one or more of the steps described herein. The IAB node 150 may include both a base station type functionality that allows for transmission and reception to and from the child node and a UE-type functionality that allows for transmission and reception to and from a parent node.

At block 905, the method 900 may optionally include receiving, from the child node, dynamic timing adjustment capabilities of the child node. The one child node may be a user equipment (UE) or a second IAB node. In some examples, the dynamic timing adjustment capabilities includes at least one or more of radio frequency (RF)-intermediate frequency (IF) retuning latency, downlink-to-uplink switching latency of the child node, or an estimated propagation delay between the IAB node and the child node. Additionally or alternatively, the dynamic timing adjustment capabilities of the child node may further include one or more of maximum supported number of offset values and range of each offset value supported by the child node. Aspects of block 905 may be performed by transceiver 802 described with reference to FIG. 8. For example, the one or more antennas 865 of the IAB node 150 may receive electro-magnetic signals associated with the dynamic timing adjustment capabilities of the child node. The RF front end 888 of the IAB node 150 may filter, amplify, and/or extract electrical signals carried by the electro-magnetic signals. The transceiver 802 or the receiver 806 of the IAB node 150 may digitize and convert the electrical signals into data, such as the dynamic timing adjustment capabilities of the child node, and send to the modem 850 of the IAB node 150. Thus, the modem 850, the transceiver 802, the transmitter 808, the RF front end 888, the one or more antennas 865, the one or more processors 812, and/or the IAB node 150 or one of its subcomponents may define the means for receiving the dynamic timing adjustment capabilities of the child node.

At block 910, the method 900 may include determining, at an integrated access and backhaul (IAB) node, to transition from a first operational mode to a second operational mode. In some examples, the first operational mode may be associated with a first access link timing and the second operational mode may be associated with a second access link timing. Aspects of block 910 may be performed by timing management component 850 in collaboration with the operational mode component 855 described with reference to FIG. 8. Thus, the modem 850, the one or more processors 812, and/or the IAB node 150 or one of its subcomponents may define the means for determining, at an integrated access and backhaul (IAB) node, to transition from a first operational mode to a second operational mode.

At block 915, the method 900 may include identifying a timing offset value from a base reference time that is associated with the second operational mode. Specifically, each operational mode of the IAB node (e.g., first operational mode, second operational mode, third operational mode, etc.) may have a respective timing offset value from a network reference time (E.g., $T_{TA\_Base}$). For instance, the first operational mode may have a first timing offset value based off of the network reference time, and the second operational mode may have a second timing offset value based off of the network reference time. The first timing offset value and the second timing offset value may be different. The timing offset value may also include a set of different timing offset values configured for the child node, each of the different timing offset values of the set corresponds to a different IAB operational modes. In some examples, the timing offset value(s) may be adjusted by the IAB node. The adjusted timing offset value may be signaled to the child node via RRC configuration or MAC-CE signaling. Additionally or alternatively, the set of different timing offset values may be grouped into multiple subset such that an offset adjustment command from the IAB node may include a group index corresponding to one or more timing offset values in the set that are to be adjusted. Aspects of block 915 may be performed by the timing management component 855 and/or operational mode component 855 described with reference to FIG. 8. Thus, the modem 850, the one or more processors 812, and/or the IAB node 150 or one of its subcomponents may define the means for identifying a timing offset value from a base reference time that is associated with the second operational mode.

At block 920, the method 900 may optionally include determining, at the IAB node, a length of guard period required for transition gap based on one or more of the RF-IF retuning latency, the downlink-to-uplink switching latency of the child node, or an estimated propagation delay between the IAB node and the child node. In some examples, the method may further include inserting a guard time based on the length of guard period during the transition from the first operational mode to the second operational mode. Aspects of block 920 may be performed by the guard period component 860 described with reference to FIG. 8. Thus, the modem 850, the one or more processors 812, and/or the IAB node 150 or one of its subcomponents may define the means for determining, at the IAB node, a length of guard period required for transition gap based on one or more of the RF-IF retuning latency, the downlink-to-uplink switching latency of the child node, or an estimated propagation delay between the IAB node and the child node.

At block 925, the method 900 may include transmitting a dynamic timing indication to a child node that identifies the timing offset value. Aspects of block 925 may be performed by transceiver 802 described with reference to FIG. 8. The modem 850 of the IAB node 150 may send the dynamic timing indication to the transceiver 802 or the transmitter 808 of the IAB node 150. The transceiver 802 or the transmitter 808 may convert the data into electrical signals. The RF front end 888 may filter and/or amplify the electrical signals into the electro-magnetic signals. The one or more antennas 865 of the IAB node 150 may transmit the electro-magnetic signals associated with the dynamic timing indication. Thus, the modem 850, the transceiver 802, the transmitter 808, the RF front end 888, the one or more antennas 865, the one or more processors 812, and/or the IAB node 150 or one of its subcomponents may define the means for transmitting the RRC information. Thus, the modem 850, the transceiver 802, the transmitter 808, the RF front end 888, the one or more antennas 865, the one or more processors 812, and/or the IAB node 150 or one of its subcomponents may define the means for transmitting a dynamic timing indication to a child node that identifies the timing offset value.

In a non-limiting example of a method for wireless communications in accordance with aspects of the present disclosure, the modem 850 of the IAB node 150 may receive a timing offset value ($T_{offset}$) from the parent node 415. In certain examples, the parent node 415 may be a gNB, such as the base station 102. The timing offset value, $T_{offset}$, may account for the uplink-to-downlink or downlink-to-uplink switching latency of the parent node 415 and/or any hardware impairment. Thus, the modem 850, the transceiver 802, the transmitter 808, the RF front end 888, the one or more antennas 865, the one or more processors 812, and/or the IAB node 150 or one of its subcomponents may define the means for receiving the timing offset value ($T_{offset}$).

In some implementations, the operational mode component 855 and/or the timing management component 855 of the IAB node 150 may determine, at an integrated access and backhaul (IAB) node, to transition from a first operational mode to a second operational mode, wherein the first operational mode is associated with a first access link timing and the second operational mode is associated with a second access link timing. For example, the timing management component 850 in collaboration with the operational mode component 855 described with reference to FIG. 8 may determine to transition from a first operational mode to a second operational mode. The second access link timing may include at least one of the Access DL Tx or the Access UL Rx as shown in FIG. 5B, for example. The at least one of the Access DL Tx or the Access UL Rx may be temporally ahead of the BH DL Rx. In other words, the at least one of the Access DL Tx or the Access UL Rx may be a gap value ($T_G$AP) in front of the BH DL Rx.

In some implementations, the timing management component 855 of the IAB node 150 may identify a gap value $T_{GAP}$ separating the Access DL Tx from the BH DL Rx. The gap value $T_{GAP}$ may be a function of the timing advance $T_{TA}$ of the Access Link and/or the timing offset value $T_{offset}$. In a non-limiting example, the timing advance $T_{TA}$ may be a function of the $T_{P\_BH}$, which is the timing associated with the propagation delay between the BH UL Tx and the BH DL Rx (i.e., propagation time required for data to be transmitted from the IAB node 150 to the parent node 415 or from the parent node 415 to the IAB node 150). Similar to Equation 1 above, the $T_{TA}$ (at the IAB node 150) may be described as $T_{TA}=2\cdot T_{P\_BH}$. In another example, the gap value $T_{GAP}$ between the Access DL Tx and the BH DL Rx may be a function of the dynamic timing offset value $T_{offset}$ from the parent node 415. Thus, the modem 850, the one or more processors 812, and/or the IAB node 150 or one of its subcomponents may define the means for determining, at an integrated access and backhaul (IAB) node, to transition from a first operational mode to a second operational mode. Thus, the modem 850, the one or more processors 812, and/or the IAB node 150 or one of its subcomponents may define the means for identifying a timing offset value from a base reference time that is associated with the second operational mode.

In an aspect of the present disclosure, the gap value $T_{GAP}$ between the Access DL Tx and the BH DL Rx may be $T_{TA}/2$, as shown in FIG. 5A. In another example, the gap value $T_{GAP}$ may be $T_{TA}$, as shown in FIG. 5B. In yet another example, the gap value $T_{GAP}$ may be 0, as shown in FIG. 5C. In other aspects of the present disclosure, the gap value $T_{GAP}$ may be $T_{TA}/2+T_{offset}$. In some aspects, the gap value $T_{GAP}$ may be $T_{TA}+T_{offset}$.

In one aspect of the present disclosure, the modem 850 of the transceiver 802 of the IAB node 150 may transmit a dynamic timing indication to a child node that identifies the gap value $T_{GAP}$. Thus, the modem 850, the transceiver 802, the transmitter 808, the RF front end 888, the one or more antennas 865, the one or more processors 812, and/or the IAB node 150 or one of its subcomponents may define the means for transmitting a dynamic timing indication to a child node that identifies the timing offset value.

Some Further Example Embodiments

An aspect of the present disclosure includes a method for receiving a timing offset value from a parent node, determining, at an integrated access and backhaul (IAB) node, to transition from a first operational mode to a second operational mode, wherein the first operational mode is associated with a first access link timing and the second operational mode is associated with a second access link timing, identifying a gap value associated with the second operational mode, wherein the gap value is determined based on the timing offset value, and transmitting, to a child node, a dynamic timing indication identifying the gap value.

Some aspects of the present disclosure includes a method for receiving a timing offset value from a parent node, determining, at an integrated access and backhaul (IAB) node, to transition from a first operational mode to a second operational mode, wherein the first operational mode is associated with a first access link timing and the second operational mode is associated with a second access link timing, identifying a gap value associated with the second operational mode, wherein the gap value is determined based on the timing offset value, and transmitting, to a child node, a dynamic timing indication identifying the gap value.

Any of the above example methods, wherein identifying the gap value further includes determining the gap value based on a timing advance value associated with a propagation delay between the IAB node and the parent node and the timing offset value.

Any of the above example methods, wherein the timing advance value is a first sum of a first propagation time for first data to be transmitted from the IAB node to the parent node and a second propagation time for second data to be transmitted from the parent node to the IAB node.

Any of the above example methods, wherein the gap value is a second sum of the timing offset value and one-half of the timing advance value.

Any of the above example methods, wherein the timing offset value is associated with at least one of an uplink-to-downlink switching latency of the parent node, a downlink-to-uplink switching latency of the parent node, or a hardware impairment of the parent node.

Any of the above example methods, wherein receiving the timing offset value further comprises receiving the timing offset value from the parent node via radio resource control (RRC) configuration or media access control (MAC) control element (MAC-CE) signaling.

Any of the above example methods, wherein the gap value indicates a time between an access downlink transmission and a backhaul downlink reception.

Any of the above example methods, wherein the IAB node includes both a base station type functionality that allows for transmission and reception to and from the child node and a UE-type functionality that allows for transmission and reception to and from the parent node.

Any of the above example methods, wherein the child node is a user equipment (UE) or another IAB node.

An aspect of the present disclosure may include an apparatus having a memory having instructions and a processor configured to execute the instructions to perform the steps of determining, at an integrated access and backhaul node, to transition from a first operational mode to a second operational mode, wherein the first operational mode is associated with a first access link timing and the second operational mode is associated with a second access link timing, identifying a timing offset value from a base reference time that is associated with the second operational mode, and transmitting a dynamic timing indication to a child node that identifies the timing offset value.

Some aspects of the present disclosure may include an apparatus having a memory having instructions and a processor configured to execute the instructions to perform the steps of receiving a timing offset value from a parent node, determining, at an integrated access and backhaul (IAB) node, to transition from a first operational mode to a second operational mode, wherein the first operational mode is associated with a first access link timing and the second operational mode is associated with a second access link timing, identifying a gap value associated with the second operational mode, wherein the gap value is determined based on the timing offset value, and transmitting, to a child node, a dynamic timing indication identifying the gap value.

Any of the above example apparatuses, wherein identifying the gap value further includes determining the gap value based on a timing advance value associated with a propagation delay between the IAB node and the parent node and the timing offset value.

Any of the above example apparatuses, wherein the timing advance value is a first sum of a first propagation time for first data to be transmitted from the IAB node to the parent node and a second propagation time for second data to be transmitted from the parent node to the IAB node.

Any of the above example apparatuses, wherein the gap value is a second sum of the timing offset value and one-half of the timing advance value.

Any of the above example methods, wherein the timing offset value is associated with at least one of an uplink-to-downlink switching latency of the parent node, a downlink-to-uplink switching latency of the parent node, or a hardware impairment of the parent node.

Any of the above example apparatuses, wherein receiving the timing offset value further comprises receiving the timing offset value from the parent node via radio resource control (RRC) configuration or media access control (MAC) control element (MAC-CE) signaling.

Any of the above example apparatuses, wherein the gap value indicates a time between an access downlink transmission and a backhaul downlink reception.

Any of the above example apparatuses, wherein the IAB node includes both a base station type functionality that allows for transmission and reception to and from the child node and a UE-type functionality that allows for transmission and reception to and from the parent node.

Any of the above example apparatuses, wherein the child node is a user equipment (UE) or another IAB node.

An aspect of the present disclosure may include a non-transitory computer readable medium includes instructions stored therein that, when executed by a processor, cause the processor to perform the steps of determining, at an integrated access and backhaul node, to transition from a first operational mode to a second operational mode, wherein the first operational mode is associated with a first access link timing and the second operational mode is associated with a second access link timing, identifying a timing offset value from a base reference time that is associated with the second operational mode, and transmitting a dynamic timing indication to a child node that identifies the timing offset value.

Some aspects of the present disclosure may include a non-transitory computer readable medium includes instructions stored therein that, when executed by a processor, cause the processor to perform the steps of receiving a timing offset value from a parent node, determining, at an integrated access and backhaul (IAB) node, to transition from a first operational mode to a second operational mode, wherein the first operational mode is associated with a first access link timing and the second operational mode is associated with a second access link timing, identifying a gap value associated with the second operational mode, wherein the gap value is determined based on the timing offset value, and transmitting, to a child node, a dynamic timing indication identifying the gap value.

Any of the above example non-transitory computer readable media, wherein the instructions for identifying the gap value further includes instructions for determining the gap value based on a timing advance value associated with a propagation delay between the IAB node and the parent node and the timing offset value.

Any of the above example non-transitory computer readable media, wherein the timing advance value is a first sum of a first propagation time for first data to be transmitted from the IAB node to the parent node and a second propagation time for second data to be transmitted from the parent node to the IAB node.

Any of the above example non-transitory computer readable media, wherein the gap value is a second sum of the timing offset value and one-half of the timing advance value.

Any of the above example non-transitory computer readable media, wherein the timing offset value is associated with at least one of an uplink-to-downlink switching latency of the parent node, a downlink-to-uplink switching latency of the parent node, or a hardware impairment of the parent node.

Any of the above example non-transitory computer readable media, wherein the instructions for receiving the timing offset value further comprises instructions for receiving the timing offset value from the parent node via radio resource control (RRC) configuration or media access control (MAC) control element (MAC-CE) signaling.

Any of the above example non-transitory computer readable media, wherein the gap value indicates a time between an access downlink transmission and a backhaul downlink reception.

Any of the above example non-transitory computer readable media, wherein the IAB node includes both a base station type functionality that allows for transmission and reception to and from the child node and a UE-type functionality that allows for transmission and reception to and from the parent node.

Any of the above example non-transitory computer readable media, wherein the child node is a user equipment (UE) or another IAB node.

An aspect of the present disclosure may include an apparatus including means for determining, at an integrated access and backhaul node, to transition from a first operational mode to a second operational mode, wherein the first operational mode is associated with a first access link timing and the second operational mode is associated with a second access link timing, means for identifying a timing offset value from a base reference time that is associated with the second operational mode, and means for transmitting a dynamic timing indication to a child node that identifies the timing offset value.

Some aspects of the present disclosure may include an apparatus including means for receiving a timing offset value from a parent node, means for determining, at an integrated access and backhaul (IAB) node, to transition from a first operational mode to a second operational mode, wherein the first operational mode is associated with a first access link timing and the second operational mode is associated with a second access link timing, means for identifying a gap value associated with the second operational mode, wherein the gap value is determined based on the timing offset value, and means for transmitting, to a child node, a dynamic timing indication identifying the gap value.

Any of the above example apparatuses, wherein the means for identifying the gap value further includes means for determining the gap value based on a timing advance value associated with a propagation delay between the IAB node and the parent node and the timing offset value.

Any of the above example apparatuses, wherein the timing advance value is a first sum of a first propagation time for first data to be transmitted from the IAB node to the parent node and a second propagation time for second data to be transmitted from the parent node to the IAB node.

Any of the above example apparatuses, wherein the gap value is a second sum of the timing offset value and one-half of the timing advance value.

Any of the above example methods, wherein the timing offset value is associated with at least one of an uplink-to-downlink switching latency of the parent node, a downlink-to-uplink switching latency of the parent node, or a hardware impairment of the parent node.

Any of the above example apparatuses, wherein the means for receiving the timing offset value further comprises means for receiving the timing offset value from the parent node via radio resource control (RRC) configuration or media access control (MAC) control element (MAC-CE) signaling.

Any of the above example apparatuses, wherein the gap value indicates a time between an access downlink transmission and a backhaul downlink reception.

Any of the above example apparatuses, wherein the IAB node includes both a base station type functionality that allows for transmission and reception to and from the child node and a UE-type functionality that allows for transmission and reception to and from the parent node.

Any of the above example apparatuses, wherein the child node is a user equipment (UE) or another IAB node.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An integrated access and backhaul (IAB) node for wireless communication comprising:
   a memory; and
   a processor coupled to the memory, wherein the processor is configured to:
      receive a timing offset value;
      operate in an operational mode, wherein the operational mode is a first operational mode or a second operational mode, wherein the first operational mode is associated with a first access link timing and the second operational mode is associated with a second access link timing; and
      transmit, to a child node, a timing indication indicative of timing advance value, wherein the timing advance value is based on the timing offset value and the operational mode.

2. The IAB node of claim 1, wherein the timing advance value is based on a propagation delay between the IAB node and a parent node.

3. The IAB node of claim 1, wherein the timing advance value is based on a sum of a first propagation time for first data to be transmitted from the IAB node to a parent node and a second propagation time for second data to be transmitted from the parent node to the IAB node.

4. The IAB node of claim 1, wherein the timing offset value is associated with at least one of an uplink-to-downlink switching latency of a parent node, a downlink-to-uplink switching latency of the parent node, or a hardware impairment of the parent node.

5. The IAB node of claim 1, wherein, to receive the timing offset value, the processor is configured to receive the timing offset value from a parent node via radio resource control (RRC) configuration or media access control (MAC) control element (MAC-CE) signaling.

6. The IAB node of claim 1, wherein the IAB node includes both a base station type functionality that allows for transmission and reception to and from the child node, and a UE-type functionality that allows for transmission and reception to and from a parent node.

7. The IAB node of claim 1, wherein the child node is a user equipment (UE) or another IAB node.

8. A method of wireless communication performed by an integrated access and backhaul (IAB) node, the method comprising:
   receiving a timing offset value;
   operating in an operational mode, wherein the operational mode is a first operational mode or a second operational mode, wherein the first operational mode is associated with a first access link timing and the second operational mode is associated with a second access link timing; and
   transmitting, to a child node, a timing indication indicative of timing advance value, wherein the timing advance value is based on the timing offset value and the operational mode.

9. The method of claim 8, wherein the timing advance value is based on a propagation delay between the IAB node and a parent node.

10. The method of claim 8, wherein the timing advance value is based on a sum of a first propagation time for first data to be transmitted from the IAB node to a parent node and a second propagation time for second data to be transmitted from the parent node to the IAB node.

11. The method of claim 8, wherein the timing offset value is associated with at least one of an uplink-to-downlink switching latency of a parent node, a downlink-to-uplink switching latency of the parent node, or a hardware impairment of the parent node.

12. The method of claim 8, wherein receiving the timing offset value comprises receive the timing offset value from a parent node via radio resource control (RRC) configuration or media access control (MAC) control element (MAC-CE) signaling.

13. The method of claim 8, wherein the IAB node includes both a base station type functionality that allows for transmission and reception to and from the child node, and a UE-type functionality that allows for transmission and reception to and from a parent node.

14. The method of claim 8, wherein the child node is a user equipment (UE) or another IAB node.

15. A non-transitory computer readable storage medium having stored thereon instructions that, when executed, cause a processor of an integrated access and backhaul (IAB) node to:
   receive a timing offset value;
   operate the IAB node in an operational mode, wherein the operational mode is a first operational mode or a second operational mode, wherein the first operational mode is associated with a first access link timing and the second operational mode is associated with a second access link timing; and
   transmit, to a child node, a timing indication indicative of timing advance value, wherein the timing advance value is based on the timing offset value and the operational mode.

16. The non-transitory computer-readable storage medium of claim 15, wherein the timing advance value is based on a propagation delay between the IAB node and a parent node.

17. The non-transitory computer-readable storage medium of claim 15, wherein the timing advance value is based on a sum of a first propagation time for first data to be transmitted from the IAB node to a parent node and a second propagation time for second data to be transmitted from the parent node to the IAB node.

18. The non-transitory computer-readable storage medium of claim 15, wherein the timing offset value is associated with at least one of an uplink-to-downlink switching latency of a parent node, a downlink-to-uplink switching latency of the parent node, or a hardware impairment of the parent node.

19. The non-transitory computer-readable storage medium of claim 15, wherein the instructions that cause the processor to receive the timing offset value comprise instructions that cause the processor to receive the timing offset value from a parent node via radio resource control (RRC) configuration or media access control (MAC) control element (MAC-CE) signaling.

20. The non-transitory computer-readable storage medium of claim 15, wherein the IAB node includes both a base station type functionality that allows for transmission and reception to and from the child node, and a UE-type functionality that allows for transmission and reception to and from a parent node.

21. The non-transitory computer-readable storage medium of claim 15, wherein the child node is a user equipment (UE) or another IAB node.

* * * * *